United States Patent
Aamer et al.

(10) Patent No.: US 9,636,641 B2
(45) Date of Patent: May 2, 2017

(54) HYDROPHILICALLY MODIFIED FLUORINATED MEMBRANE (I)

(71) Applicant: PALL CORPORATION, Port Washington, NY (US)

(72) Inventors: Khaled Abdel-Hakim Helmy Aamer, Port Washington, NY (US); Jian Qiu, Oakland Gardens, NY (US); Hassan Ait-Haddou, Melville, NY (US)

(73) Assignee: Pall Corporation, Port Washington, NY (US)

(*) Notice: Subject to any disclaimer, the term of this patent is extended or adjusted under 35 U.S.C. 154(b) by 261 days.

(21) Appl. No.: 14/675,528

(22) Filed: Mar. 31, 2015

(65) Prior Publication Data

US 2016/0288061 A1 Oct. 6, 2016

(51) Int. Cl.
*B01D 71/44* (2006.01)
*B01D 71/32* (2006.01)
(Continued)

(52) U.S. Cl.
CPC ......... *B01D 71/44* (2013.01); *B01D 67/0006* (2013.01); *B01D 67/0088* (2013.01);
(Continued)

(58) Field of Classification Search
None
See application file for complete search history.

(56) References Cited

U.S. PATENT DOCUMENTS 4,136,237 A 1/1979 Takahashi et al.
4,975,507 A 12/1990 Asrar
(Continued)

FOREIGN PATENT DOCUMENTS

CN 101490126 A 7/2009
CN 103415335 A 11/2013
(Continued)

OTHER PUBLICATIONS

European Patent Office, Extended European Search Report issued in European Application No. 15196329.5, 5 pp. (Sep. 5, 2016).
(Continued)

*Primary Examiner* — Krishnan S Menon
(74) *Attorney, Agent, or Firm* — Leydig, Voit & Mayer, Ltd.

(57) ABSTRACT

Disclosed are polymers suitable for hydrophilically modifying the surface of porous fluoropolymer supports, for example, a copolymer of the formula:

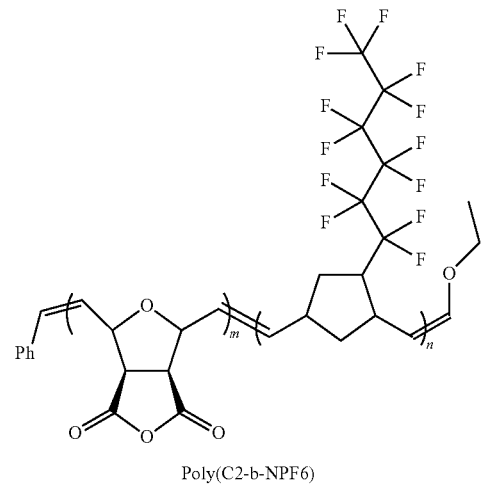

Poly(C2-b-NPF6)

Also disclosed are a method of preparing the polymers, a method of hydrophilically modifying porous fluoropolymer
(Continued)

supports, hydrophilic fluoropolymer porous membranes prepared from the polymers, and a method of filtering fluids through the porous membranes.

13 Claims, 2 Drawing Sheets

(51) Int. Cl.
*B01D 69/10* (2006.01)
*B01D 67/00* (2006.01)
*C08J 5/22* (2006.01)
*C08J 7/04* (2006.01)

(52) U.S. Cl.
CPC .............. *B01D 69/10* (2013.01); *B01D 71/32* (2013.01); *C08J 5/2237* (2013.01); *C08J 7/047* (2013.01); B01D 2323/02 (2013.01); B01D 2323/30 (2013.01); C08J 2327/18 (2013.01); C08J 2427/12 (2013.01)

(56) References Cited

U.S. PATENT DOCUMENTS

| | | | |
|---|---|---|---|
| 5,117,327 | A | 5/1992 | Asrar et al. |
| 5,200,470 | A | 4/1993 | Asrar |
| 5,219,662 | A | 6/1993 | Grimminger et al. |
| 5,294,493 | A | 3/1994 | Beckerbauer et al. |
| 5,418,277 | A | 5/1995 | Ma et al. |
| 6,080,826 | A | 6/2000 | Grubbs et al. |
| 6,126,825 | A | 10/2000 | Shinagawa et al. |
| 6,303,725 | B1 | 10/2001 | Chang et al. |
| 6,313,222 | B1 | 11/2001 | Lin et al. |
| 6,436,476 | B1 | 8/2002 | Sage, Jr. |
| 6,492,443 | B1 | 12/2002 | Kodemura et al. |
| 6,653,424 | B1 | 11/2003 | Sakamoto et al. |
| 6,677,418 | B1 | 1/2004 | Feast et al. |
| 6,987,154 | B2 | 1/2006 | Choi et al. |
| 7,232,917 | B2 | 6/2007 | Sumida et al. |
| 7,514,499 | B2 | 4/2009 | Tam et al. |
| 8,143,369 | B2 | 3/2012 | Fujiwara et al. |
| 8,223,472 | B1 | 7/2012 | Dirk et al. |
| 8,283,410 | B2 | 10/2012 | Musa |
| 8,410,290 | B2 | 4/2013 | Fujiwara et al. |
| 8,431,625 | B2 | 4/2013 | Luchterhandt et al. |
| 8,678,203 | B2 | 3/2014 | Knapp et al. |
| 8,883,925 | B2 | 11/2014 | Kizu et al. |
| 9,169,361 | B1 | 10/2015 | Aamer |
| 9,441,078 | B2 * | 9/2016 | Aamer .................. C08G 81/00 |
| 2008/0234451 | A1 | 9/2008 | Kenwright et al. |
| 2009/0023877 | A1 | 1/2009 | Liaw et al. |
| 2009/0030175 | A1 | 1/2009 | Yamamoto et al. |
| 2009/0043059 | A1 | 2/2009 | Liaw et al. |
| 2009/0182117 | A1 | 7/2009 | Takeyama et al. |
| 2009/0264608 | A1 | 10/2009 | Wakatsuki et al. |
| 2009/0269601 | A1 | 10/2009 | Ishiguro et al. |
| 2009/0275719 | A1 | 11/2009 | Ishiguro et al. |
| 2011/0266220 | A1 | 11/2011 | Campos et al. |
| 2012/0041137 | A1 | 2/2012 | Musa et al. |
| 2012/0214940 | A1 | 8/2012 | Hsu et al. |
| 2012/0245271 | A1 | 9/2012 | Pawlow et al. |
| 2013/0108845 | A1 | 5/2013 | Tee et al. |
| 2013/0281644 | A1 | 10/2013 | Kiessling et al. |
| 2013/0292872 | A1 | 11/2013 | Knapp et al. |
| 2014/0042090 | A1 * | 2/2014 | Bell .................. B01D 67/0009 210/640 |
| 2014/0357820 | A1 | 12/2014 | Stephen et al. |

FOREIGN PATENT DOCUMENTS

| | | |
|---|---|---|
| WO | WO 93/15255 | 8/1993 |
| WO | WO 2004/041397 A2 | 5/2004 |

OTHER PUBLICATIONS

Intellectual Property Office of Singapore, Search Report issued in Singapore Application No. 10201509646V, 3 pp. (Jan. 7, 2016).
Faulkner et al., "Surface-initiated polymerization of 5-(perfluoro-n-alkyl)norbornenes from gold substrates". *Macromolecules*, vol. 43, pp. 1203-1209 (2010).
Taiwan Intellectual Property Office, Examination Report issued in Taiwanese Application No. 104138731 (Sep. 9, 2016) 8 pp.
Korean Intellectual Property Office, Notice of Non-Final Rejection issued in Korean Application No. 10-2015-0167630 (Sep. 28, 2016) 2 pp.

* cited by examiner

HYDROPHILICALLY MODIFIED FLUORINATED MEMBRANE (I)

BACKGROUND OF THE INVENTION

The properties of fluoropolymer membranes, for example, porous PTFE membranes, including their mechanical strength, chemical resistance or inertness, non-adhesiveness, excellent dielectric property, thermal stability at high temperature and low coefficient of friction make them very attractive for various applications. However, for certain applications, it will be beneficial to modify the surface of PTFE without affecting its intrinsic properties. Efforts have been made to modify the surface and the chemical properties of PTFE membrane in order to improve the suitability of the membrane for specific applications. For example, efforts have included surface coating, blending, high energy surface modification, for example, broad band ultraviolet radiation or BBUV, where the membrane is exposed to a UV radiation of wavelength 250-450 nm, and plasma treatment, free radical, and ozone etching, atomic layer deposition, and synthesis of modified PTFE-like polymers. However, most of the efforts were focused on high energy treatment such as BBUV and plasma. Though the exact mechanism of these surface modification approaches is not reported, it likely results from the formation of free radicals by bond scission since C—C bond strength is known to be ~40% lower than F—F bond. If a majority of the radical results from C—C scission or main polymer chain scission, it could decrease the mechanical and the chemical stability of the PTFE membrane. It is also known that plasma treatment is limited to the surface of the membrane which makes it less stable during a long period of time.

The foregoing shows that there exists an unmet need for a surface modification of porous fluoropolymer membranes or supports to provide hydrophilic fluoropolymer porous membranes which are stable, and wherein the surface modification does not significantly affect the mechanical strength of the porous fluoropolymer supports or the resulting composite porous membranes.

BRIEF SUMMARY OF THE INVENTION

The invention provides a composite hydrophilic porous membrane comprising a porous fluoropolymer support and a coating comprising a copolymer, wherein the copolymer comprises repeat units A and B, wherein A is selected from

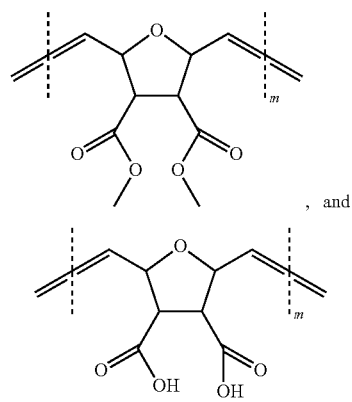

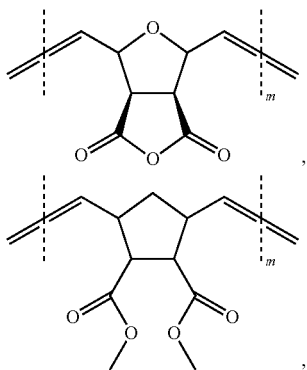

,

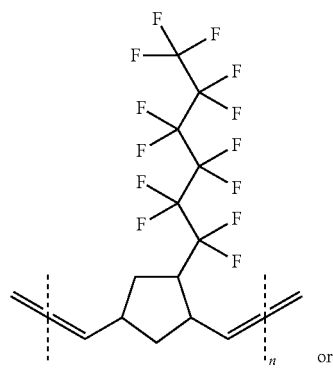

, and and B is of the formula

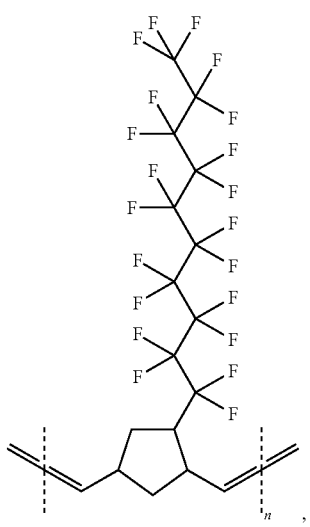

wherein n and m are from 1 to about 1000, provided the sum of n and m is equal to or greater than 10.

The invention further provides a composite hydrophilic porous membrane comprising a porous fluoropolymer support and a coating comprising a polymer having one or more perfluoroalkylthio pendant groups attached to the backbone of the polymer, whose repeat units are of the formula:

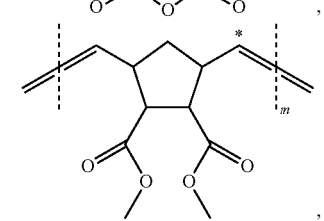

,

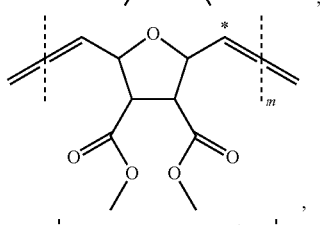

,

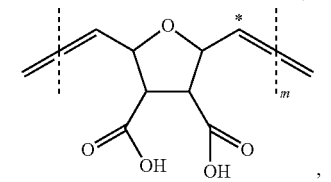

, or

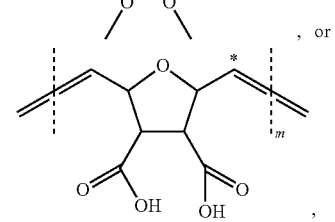

, wherein * indicates the point of attachment of the perfluoroalkylthio pendant group.

The copolymers and the polymers having perfluoroalkylthio pendant groups are useful in modifying the surface of porous fluoropolymer supports.

The present invention further provides methods of preparing the copolymers and the polymers having perfluoroalkylthio pendant groups, and methods of preparing hydrophilically modified fluoropolymer porous membranes. The invention further provides methods of filtering fluids through these porous membranes.

BRIEF DESCRIPTION OF THE SEVERAL VIEWS OF THE DRAWING(S)

DETAILED DESCRIPTION OF THE INVENTION

Figure 1:
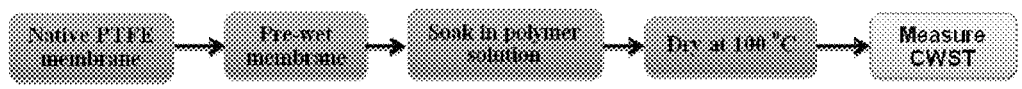
FIG. 1 illustrates a process for coating the porous fluoropolymer support with a copolymer in accordance with an embodiment of the invention.

In accordance with an embodiment, the invention provides a composite hydrophilic porous membrane comprising a porous fluoropolymer support and a coating comprising a copolymer, wherein the copolymer comprises repeat units A and B, wherein A is selected from

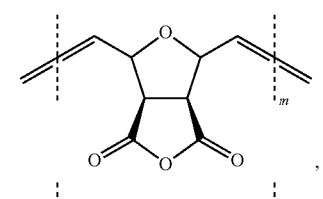

,

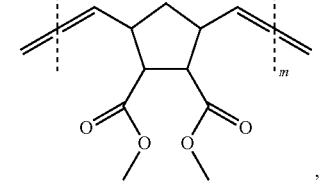

,

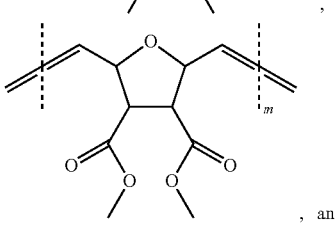

,

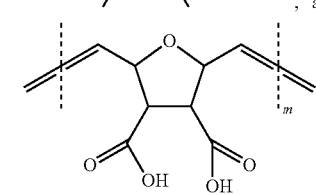

, and

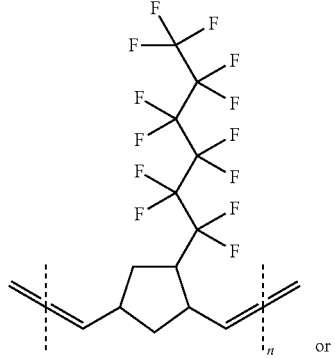

and B is of the formula

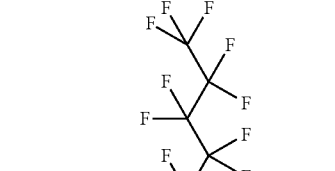

or

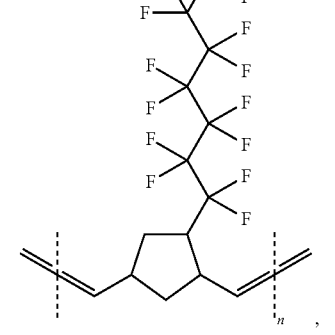

, wherein n and m are from 1 to about 1000, provided the sum of n and m is equal to or greater than 10.

In the formulas herein, dotted lines on the formulas of the repeat units indicate that the copolymer can be a block copolymer or a random copolymer. Block copolymer are indicated by parentheses: (repeat unit). Random copolymers are indicated by square brackets: [repeat unit].

In embodiments, n and m represent the degrees of polymerization of the respective monomers, and are independently from about 10 to about 1000, preferably from about 20 to about 50.

In other embodiments, n and m represent the mole fraction of the monomers present in the copolymer and n and m can independently range between 1 to 99 mole %, preferably 20 to 50 mole %.

The respective monomer blocks can be present in the block copolymer in any suitable mass %, for example, in an embodiment, from about 99%: about 1% to about 50%: about 50%, preferably from about 90%: about 10% to about 70%: about 30%, and more preferably from about 75%: about 25%.

The copolymer could be a block copolymer or a random copolymer. The block copolymer could be a diblock (A-B), triblock (A-B-A or B-A-B), or multiblock copolymer ((A-B)x). Optionally, the copolymer can have a third segment C, for example, a triblock copolymer or a random copolymer such as A-B-C.

The copolymer can be of any suitable molecular weight, for example, in an embodiment, a number or weight (Mn or Mw) average molecular weight from about 10 kDa to about 1000 kDa, preferably from about 75 kDa to about 500 kDa, and more preferably from about 250 kDa to about 500 kDa.

In accordance with an embodiment, the copolymer of the invention has one of the following formulae:

Poly(C2-b-NPF6)

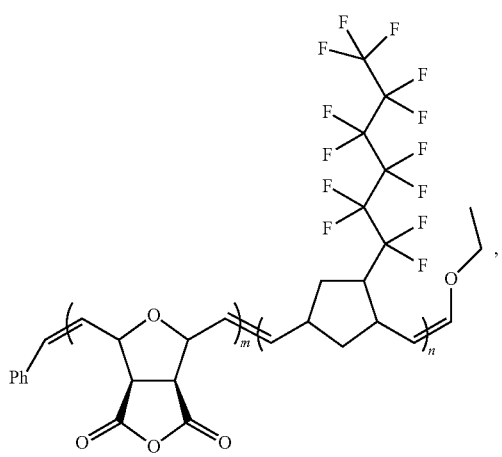

-continued

Poly(C3-b-NPF6)

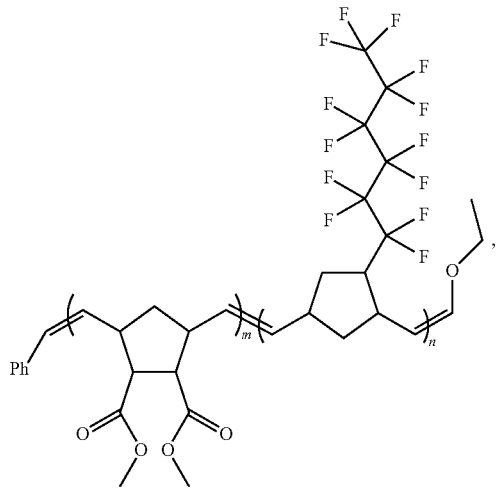

Poly(C4-b-NPF6)

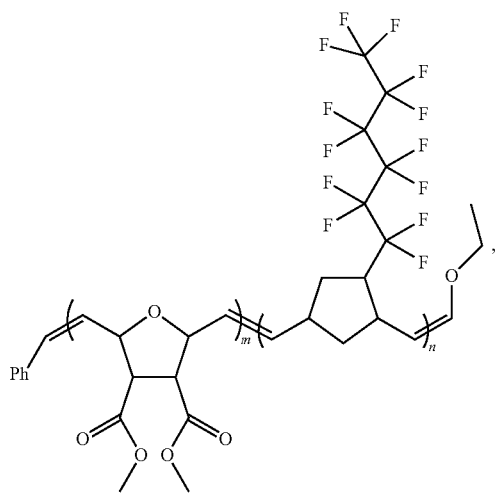

Poly(C2 diacid-b-NPF6)

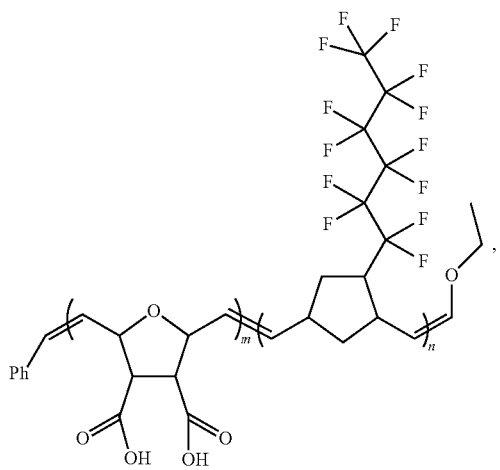

Poly(C3-r-NPF6)

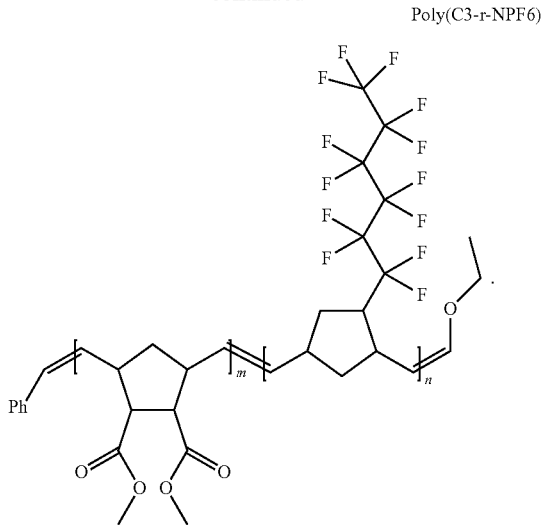

In an embodiment, the copolymer of the invention further comprises one or more repeat units C of the formula:

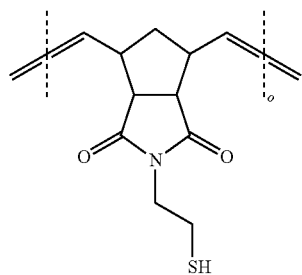

wherein the ratio o/(m+n) is from above 0 to about 0.25, preferably from about 0.05 to about 0.25, and more preferably from about 0.10 to about 0.15, mole %.

In an embodiment, the copolymer has the following formula:

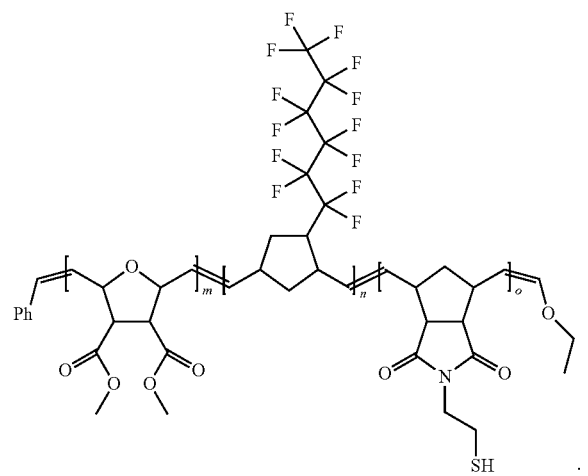

The present invention further provides a composite hydrophilic porous membrane comprising a porous fluoropolymer support and a coating comprising a polymer, wherein the polymer has one or more perfluoroalkylthio pendant groups attached to the backbone of the polymer whose repeat unit is of the formula:

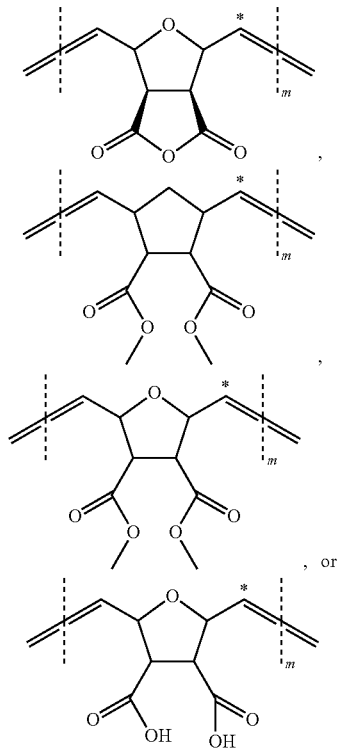

wherein * indicates the point of attachment of the perfluoroalkylthio pendant group.

In an embodiment, the polymer is of the formula:

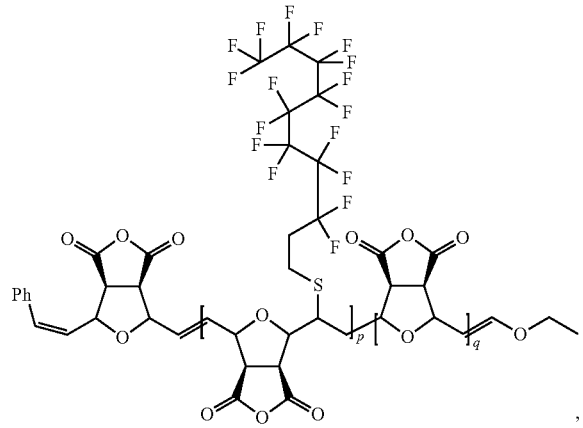

wherein p+q=m−1.

The perfluoroalkylthio pendant group can be present in some or all of the repeat units of the polymer. Thus, for example, the perfluoroalkylthio pendant group can be present in an amount above 0 to 100%, and in embodiments, from about 1 to about 50% or from 10 to about 30%, of the repeat units. The perfluoroalkylthio pendant group is located randomly in the backbone of the polymer.

The copolymers and the polymers having pendant perfluoroalkylthio groups of the invention can be prepared by any suitable method, for example, through ring opening metathesis polymerization (ROMP) of cyclic monomers. Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

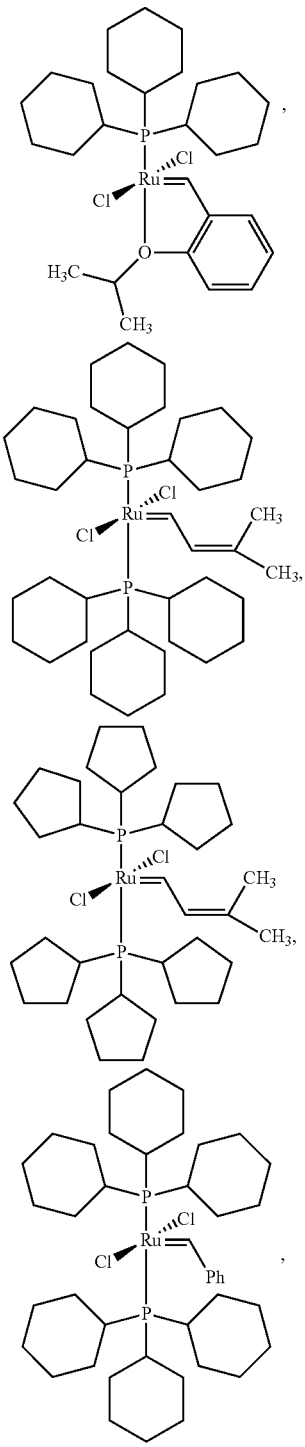

-continued

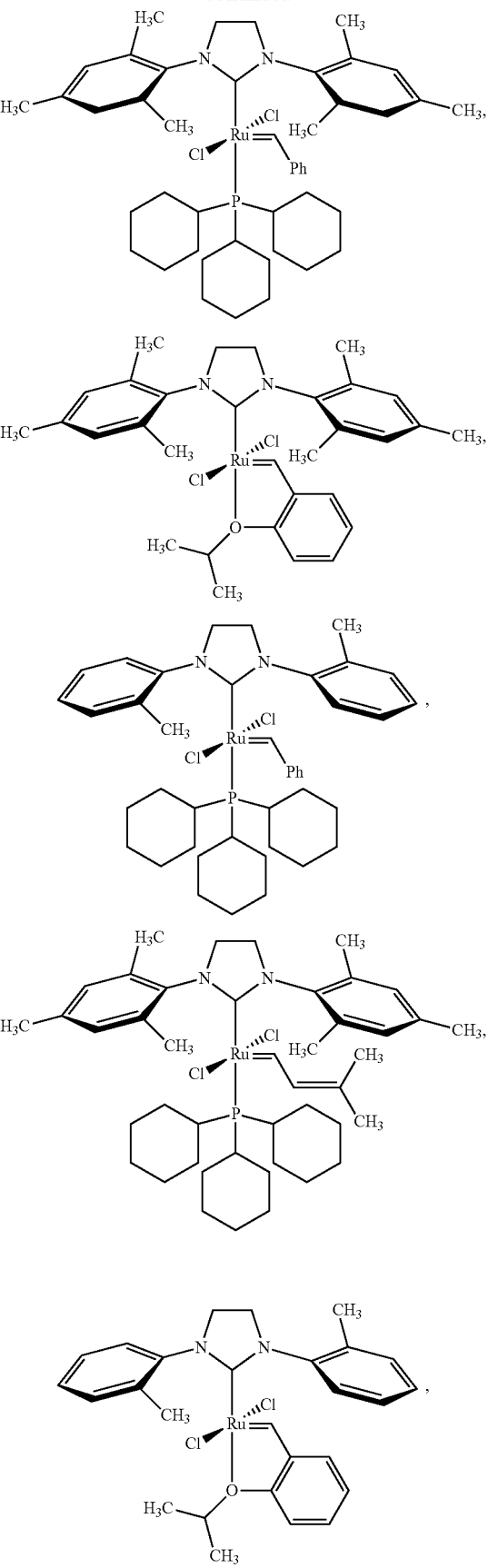

11

-continued

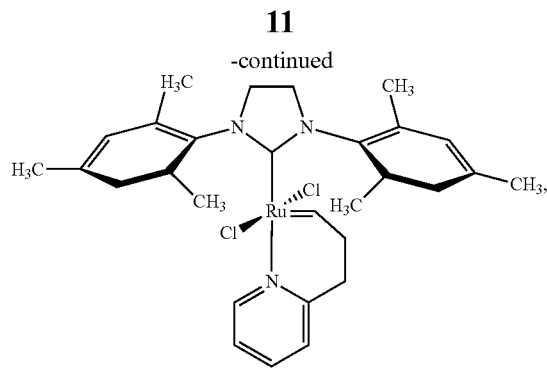

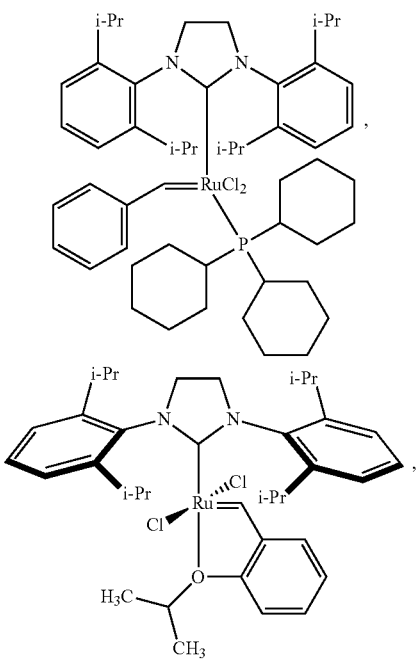

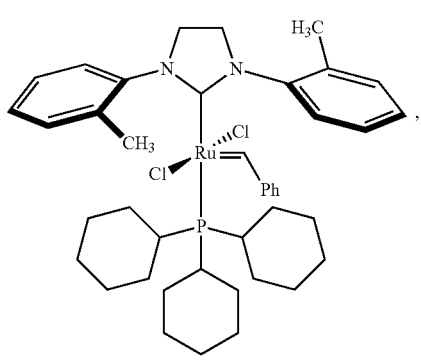

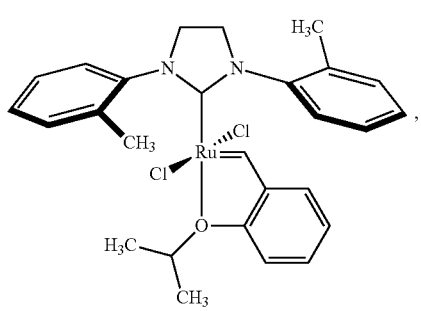

12

-continued

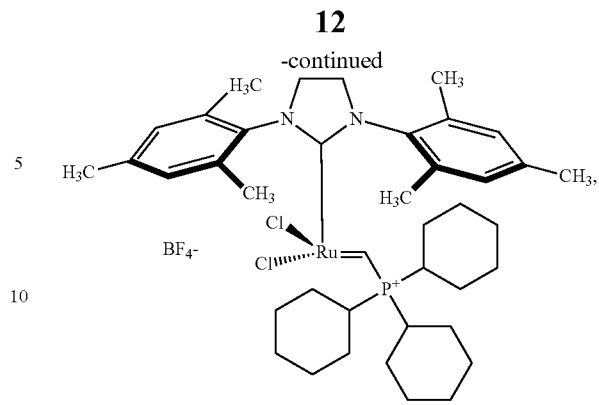

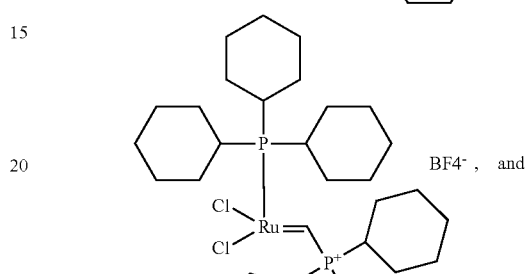

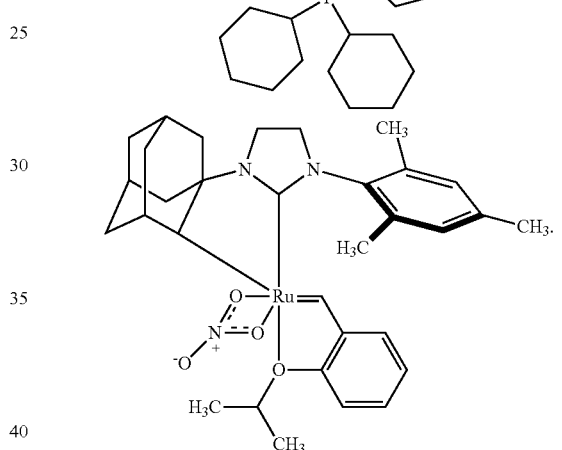

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. A preferred example of such a catalyst is:

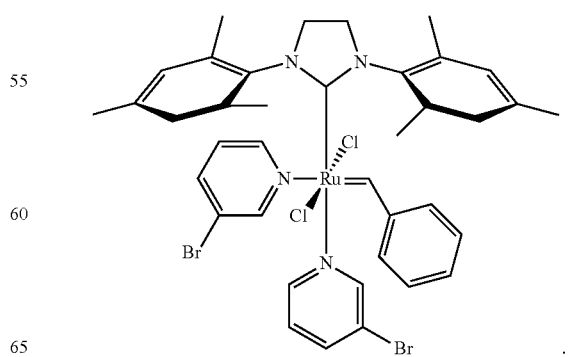

The above third generation Grubbs catalyst (G3) may be obtained commercially or prepared from a Grubbs second generation catalyst (G2) as follows:

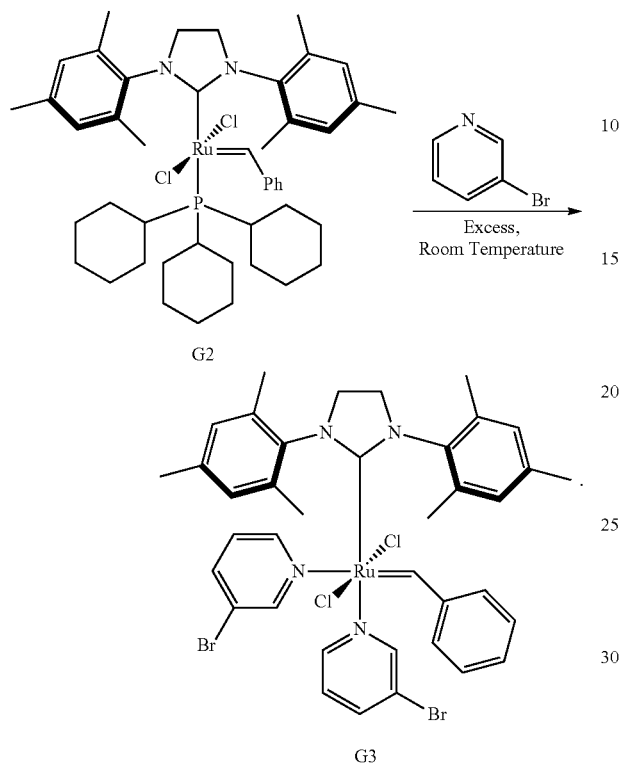

The present invention further provides a method for preparing the copolymers and polymers having pendant perfluoroalkylthio groups.

Thus, the invention provides a method of preparing a block copolymer having segment A selected from:

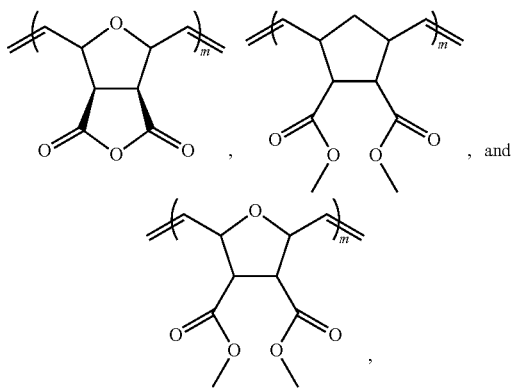

the method comprising:

(i) polymerizing a monomer selected from cis-5-oxanorbornene-exo-2,3-dicarboxylic anhydride, dimethyl ester of cis-5-norbornene-exo-2,3-dicarboxylic acid, and dimethyl ester of cis-5-oxanorbornene-exo-2,3-dicarboxylic acid, catalyzed by a ring opening metathesis polymerization (ROMP) catalyst to obtain a homopolymer; and (ii) sequentially polymerizing on a chain end of the homopolymer obtained in (i) 5-(perfluorohexyl)norbornene catalyzed by a ROMP catalyst.

The copolymer prepared from cis-5-oxanorbornene-exo-2,3-dicarboxylic anhydride (Poly(C2-b-PNF6)) can be reacted with an aqueous base to obtain a copolymer having segment A with dicarboxylic acid,

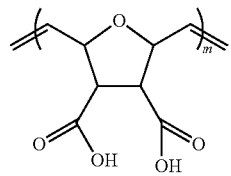

The present invention further provides a method of preparing a random copolymer of the invention, comprising polymerizing (i) a mixture of dimethyl ester of cis-5-norbornene-exo-2,3-dicarboxylic acid and 5-(perfluorohexyl)norbornene catalyzed by a ROMP catalyst or (ii) a mixture of dimethyl ester of cis-5-oxanorbornene-exo-2,3-dicarboxylic acid, 5-(perfluorohexyl)norbornene, and N-mercaptoethyl cis-5-norbornene-exo-2,3-dicarboxylimide catalyzed by a ROMP catalyst.

The present invention further provides a method of preparing the polymer having perfluoroalkylthio pendant groups, comprising (i) polymerizing a monomer selected from cis-5-oxanorbornene-exo-2,3-dicarboxylic anhydride, dimethyl ester of cis-5-norbornene-exo-2,3-dicarboxylic acid, and dimethyl ester of cis-5-oxanorbornene-exo-2,3-dicarboxylic acid, catalyzed by a ROMP catalyst to obtain a homopolymer; and (ii) reacting the resulting homopolymer with 1H, 1H, 2H, 2H-perfluorodecanethiol. The polymer prepared from cis-5-oxanorbornene-exo-2,3-dicarboxylic anhydride and modified with 1H, 1H, 2H, 2H-perfluorodecanethiol can be reacted with an aqueous base, for example, sodium hydroxide, potassium hydroxide, potassium carbonate, sodium carbonate, and the like, at a suitable concentration, e.g., 0.01N to about 10N, and preferably, from about 0.1N to 1N, to obtain a polymer having a dicarboxylic acid salt thereof which can be neutralized with a mineral acid such as hydrochloric acid, sulfuric acid, or nitric acid, to the dicarboxylic acid form,

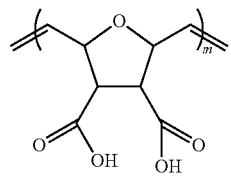

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicylic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

To prepare a block copolymer, for example, the polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to the monomer can be about 1:10 to about 1:1000, preferably about 1:50 to 1:500, and more preferably about 1:100 to about 1:200. For example, the molar ratio of the catalyst to the monomer could be 1:n and 1:m, where n and m are the average degrees of polymerization.

The polymers can be isolated by a suitable technique, for example, precipitation with a nonsolvent.

The copolymer and the polymer having perfluoroalkylthio pendant groups of the invention can be characterized for their molecular weights and molecular weight distributions by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The copolymers and polymers having perfluoroalkylthio pendant groups of the invention are highly monodisperse. For example, the copolymers have an Mw/Mn of 1.05 to 1.5, preferably 1.1 to 1.2.

In accordance with an embodiment, the invention provides a method for preparing a copolymer of the formula:

the method comprising:

(i) polymerizing cis-5-oxanorbornene-exo-2,3-dicarboxylic anhydride catalyzed by a ring opening metathesis polymerization (ROMP) catalyst to obtain a homopolymer; and (ii) polymerizing on a chain end of the homopolymer obtained in (i) 5-(perfluorohexyl)norbornene catalyzed by a ROMP catalyst, as illustrated below:

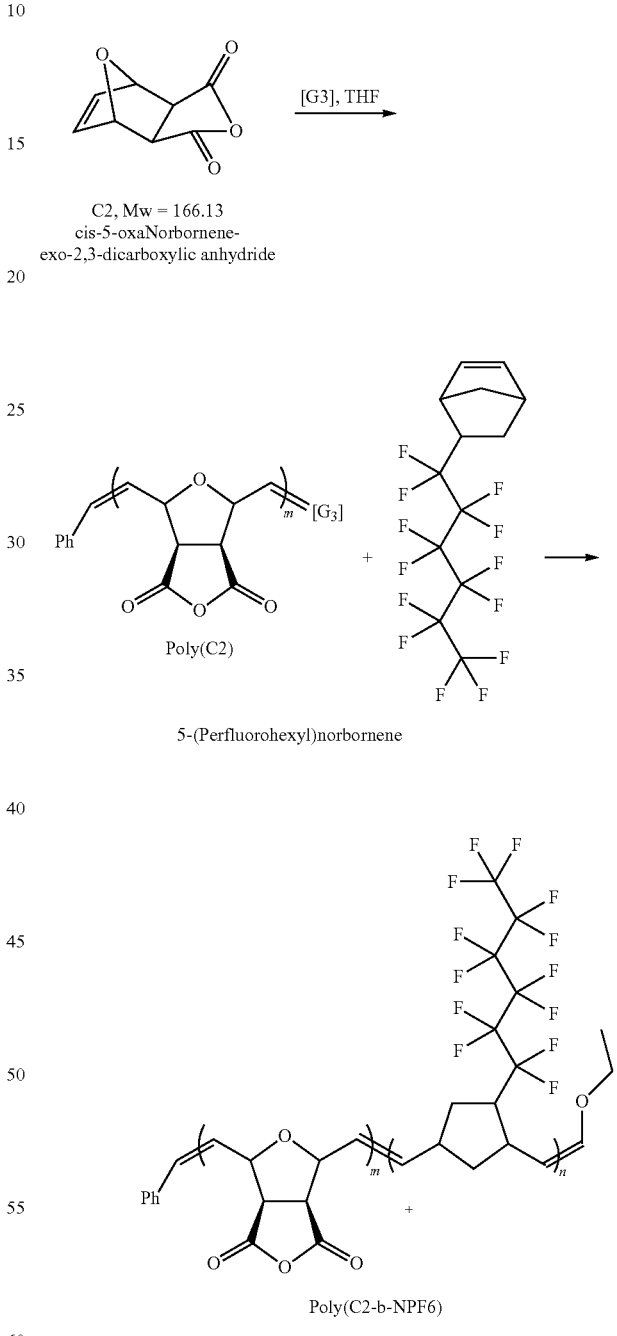

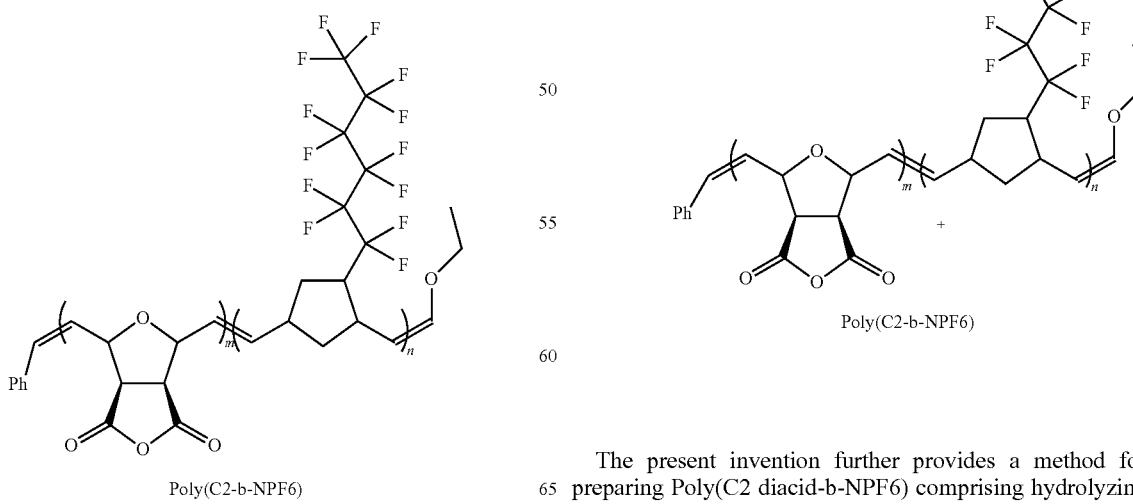

Poly(C2-b-NPF6)

The present invention further provides a method for preparing Poly(C2 diacid-b-NPF6) comprising hydrolyzing Poly(C2-b-PNF6) with an aqueous base, as illustrated below:

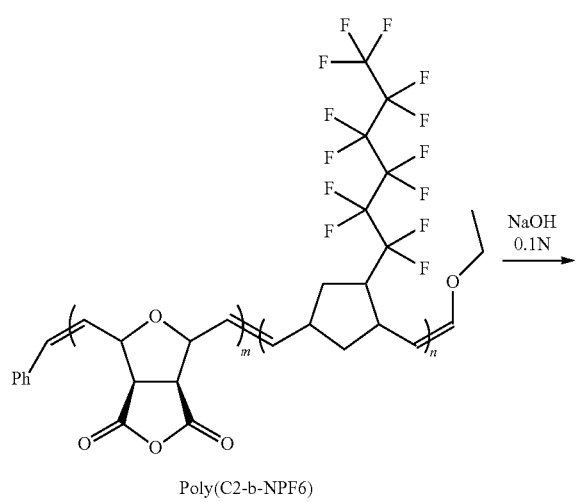

Poly(C2-b-NPF6)

NaOH 0.1N →

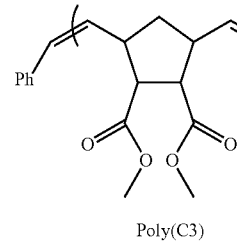

Poly(C3)

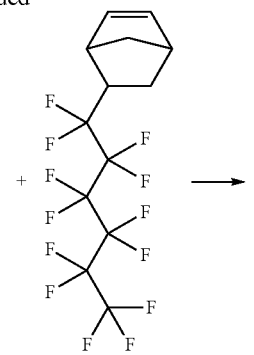

5-(Perfluorohexyl)norbornene

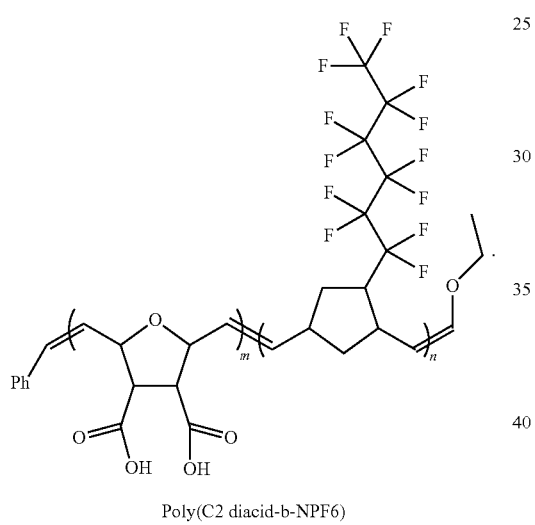

Poly(C2 diacid-b-NPF6)

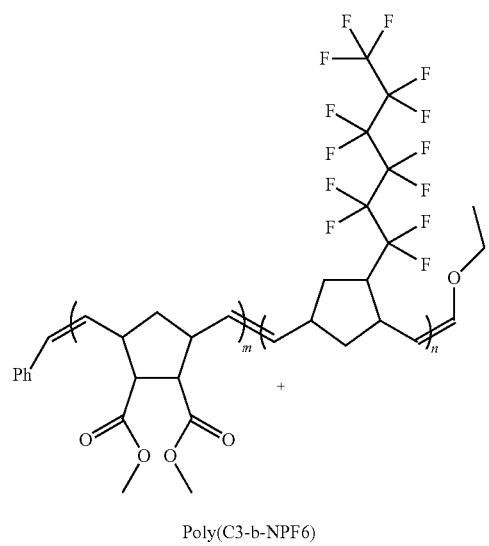

Poly(C3-b-NPF6)

The present invention further provides a method for preparing Poly(C3-b-NPF6), comprising:

(i) polymerizing dimethyl ester of cis-5-norbornene-exo-2,3-dicarboxylic acid catalyzed by a ring opening metathesis polymerization (ROMP) catalyst to obtain a homopolymer; and (ii) polymerizing on a chain end of the homopolymer obtained in (i) 5-(perfluorohexyl)norbornene catalyzed by a ROMP catalyst, as illustrated below:

The present invention further provides a method for preparing copolymer Poly(C4-b-NPF6) comprising:

(i) polymerizing dimethyl ester of cis-5-oxanorbornene-exo-2,3-dicarboxylic acid catalyzed by a ROMP catalyst to obtain a homopolymer; and (ii) polymerizing on a chain end of the homopolymer obtained in (i) 5-(perfluorohexyl)norbornene catalyzed by a ROMP catalyst

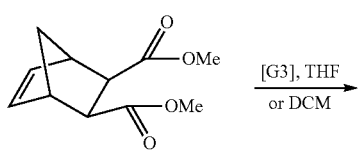

C3, Mw = 210.2
Dimetheyl ester cis-5-Norbornene-exo-2,3-dicarboxylic acid

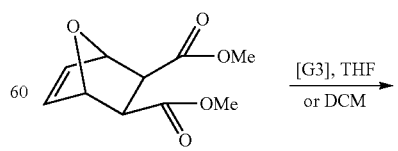

C4
Dimetheyl ester cis-5-oxaNorbornene-exo-2,3-dicarboxylic acid

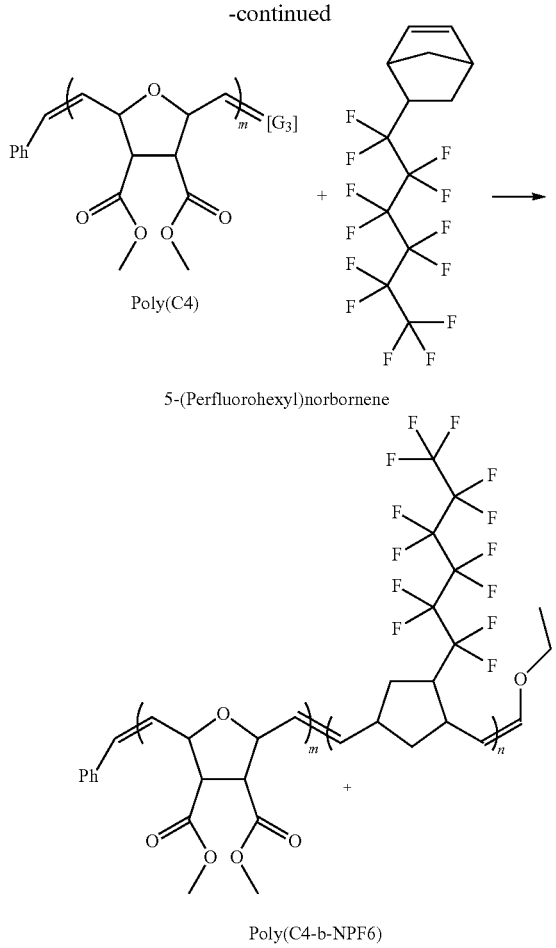

Poly(C4)

5-(Perfluorohexyl)norbornene

Poly(C4-b-NPF6)

The present invention further provides a method for preparing a copolymer Poly(C3-r-NPF6) comprising polymerizing a mixture of dimethyl ester of cis-5-norbornene-exo-2,3-dicarboxylic acid and 5-(perfluorohexyl)norbornene catalyzed by a ROMP catalyst.

The present invention further provides a method of preparing a random copolymer of the formula

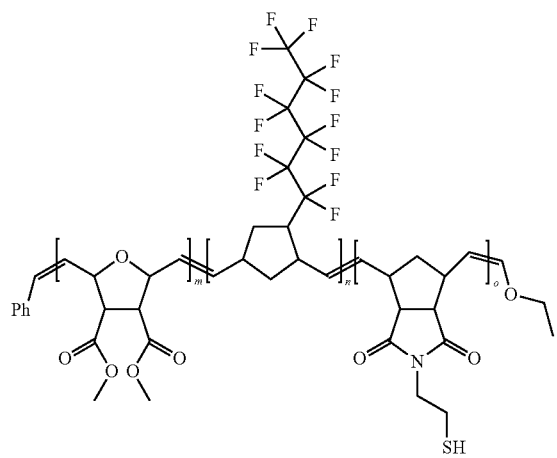

Poly(C4-r-NPF6)

comprising polymerizing a mixture of dimethyl ester of cis-5-oxanorbornene-exo-2,3-dicarboxylic acid, 5-(perfluorohexyl)norbornene, and N-mercaptoethyl cis-5-norbornene-exo-2,3-dicarboxylimide catalyzed by a ROMP catalyst.

The present invention further provides a method for preparing a polymer of the formula

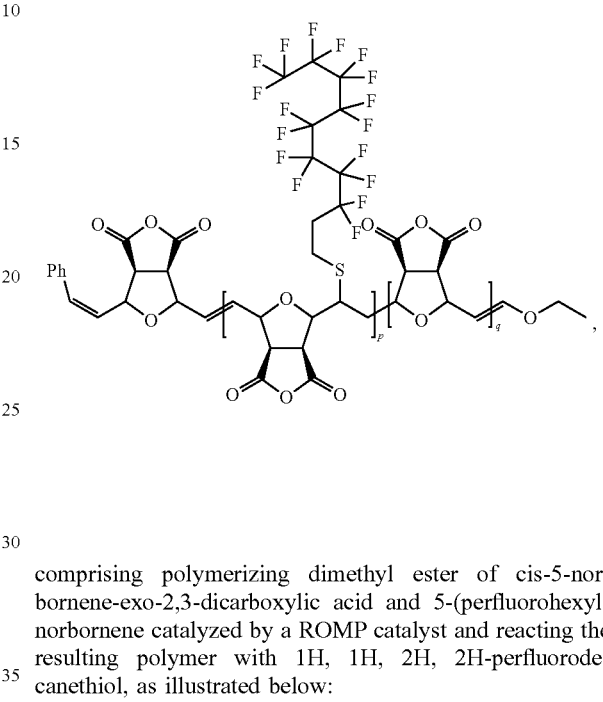

comprising polymerizing dimethyl ester of cis-5-norbornene-exo-2,3-dicarboxylic acid and 5-(perfluorohexyl)norbornene catalyzed by a ROMP catalyst and reacting the resulting polymer with 1H, 1H, 2H, 2H-perfluorodecanethiol, as illustrated below:

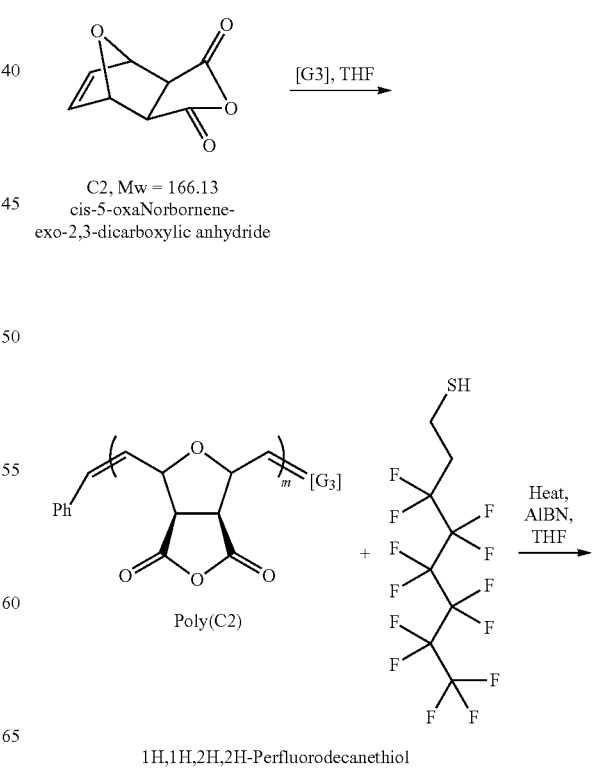

C2, Mw = 166.13
cis-5-oxaNorbornene-exo-2,3-dicarboxylic anhydride

Poly(C2)

1H,1H,2H,2H-Perfluorodecanethiol

-continued

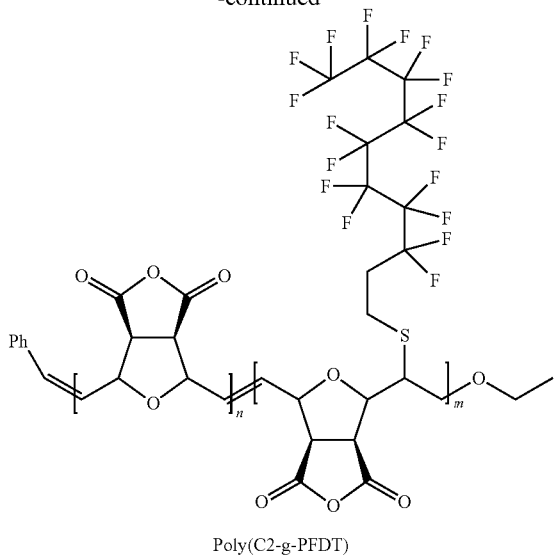

Poly(C2-g-PFDT)

In the above methods, polymerization can be terminated in a suitable manner, for example, by the use of alkyl vinyl ether such as ethyl vinyl ether. Thus, one of the end groups of the copolymers can be provided.

The other of the end groups can be provided by choosing an appropriate ROMP catalyst. For example, a phenyl end group can be provided by the use a ROMP catalyst having a benzylidenyl group on the transition metal.

The present invention further provides a composite hydrophilic porous membrane comprising a porous fluoropolymer and a copolymer or polymer as described above, wherein the copolymer or polymer is optionally crosslinked.

The present invention further provides a method of hydrophilically modifying a porous fluoropolymer support comprising:

(i) providing a porous fluoropolymer support;

(ii) coating the porous fluoropolymer support with a solution comprising a solvent and a copolymer or polymer having pendant perfluoroalkylthio groups as described above;

(iii) drying the coated porous fluoropolymer support from (ii) to remove at least some of the solvent from the solution comprising said copolymer or polymer; and optionally (iv) crosslinking the copolymer or polymer present in the coating.

Figure 2:
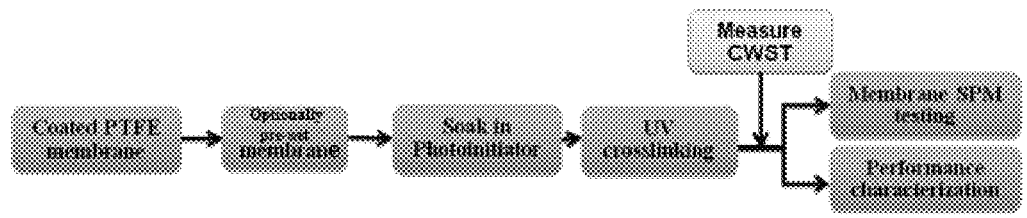
FIG. 2 illustrates a method of crosslinking the coating on a porous fluoropolymer support in accordance with an embodiment of the invention.

FIG. 1 illustrates a process for coating the porous fluoropolymer support with a copolymer in accordance with an embodiment of the invention. FIG. 2 illustrates a method of crosslinking the coating on a porous fluoropolymer support in accordance with an embodiment of the invention.

Crosslinking can be carried out by any suitable method, for example, by the use of a photoinitiator and a high energy radiation, e.g., UV. It is contemplated that the crosslinking would provide a highly stable polymer network in the membrane.

Any suitable photoinitiator can be used, for example, Type I and Type II photoinitiators. Examples of photoinitiators include camphor quinone, benzophenone, benzophenone derivatives, acetophenone, acetophenone derivatives, phosphine oxides and derivatives, benzoin alkyl ethers benzil ketals, phenylglyoxalic esters and derivatives thereof, dimeric phenylglyoxalic esters, peresters, halomethyltriazines, hexaarylbisimidazole/coinitiators systems, ferrocenium compounds, titanocenes, and combinations thereof.

The crosslinking can be carried out as follows. The polymer coated PTFE sheets are optionally pre-wet with IPA, the sheets are then washed with the solvent with which the photo-initiator is prepared in to exchange IPA with that solvent. The sheets are then soaked in a solution of photo-initiator with certain concentration for a certain time followed by exposure to UV irradiation. The soaking time in photo-initiator solution ranges from 1 minute to 24 hours. The UV irradiation time ranges from 30 seconds to 24 hours. The membrane critical wetting surface tension (CWST), performance characterization, and/or SPM testing are then measured. "SPM" means hot sulfuric acid hydrogen peroxide mixture ($H_2SO_4$ (96%): $H_2O_2$ (30%) of 80:20 by volume) at 120 to 180° C.

In accordance with an embodiment of the invention, the hydrophilic fluoropolymer membrane is a porous membrane, e.g., a nanoporous membrane, for example, a membrane having pores of diameter between 1 nm and 100 nm, or a microporous membrane having pores of diameter between 1 μm and 10 μm.

The surface tension of the resulting porous membrane can be determined as follows. For example, a sheet of PTFE porous support is coated at room temperature by pre-wetting the membrane sheet with IPA solvent and soaking the membrane in a coating polymer solution with concentration that ranges between 0.1% and 10% by mass. The coating time ranges between (1 min to 12 hours). After soaking the support, it is dried in convection oven at 100° C. to 160° C. The drying time ranges between (10 minutes to 12 h). The resulting porous PTFE membrane's wetting characteristics are measured by measuring the critical wetting surface tension.

The change in surface modification in terms of surface tension was measured by measuring the critical wetting surface tension (CWST). The method relies on a set of solutions of certain composition. Each solution has specific surface tension. The solution's surface tension ranges from 25 to 92 dyne/cm in small non-equivalent increments. To measure the membrane surface tension, the membrane is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time >10 seconds, the solution is considered to partially wet the membrane.

Hydrophilic fluoropolymer porous membranes according to embodiments of the invention can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, porous membranes according to embodiments of the invention can be used to filter air and/or gas and/or can be used for venting applications (e.g., allowing air and/or gas, but not liquid, to pass therethrough). Porous membranes according to embodiments of the inventions can be used in a variety of devices, including surgical devices and products, such as, for example, ophthalmic surgical products.

In accordance with embodiments of the invention, the hydrophilic fluoropolymer porous membrane can have a variety of configurations, including planar, flat sheet, pleated, tubular, spiral, and hollow fiber.

Hydrophilic fluoropolymer porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive porous membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

In accordance with an embodiment, the hydrophilic fluoropolymer porous membrane comprises any suitable porous fluoropolymer support, for example, a support made from PTFE, PVDF (polyvinylidene fluoride), PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane. The porous support can have any suitable pore size, e.g., from about 2 nm to about 10 microns, preferably PTFE and PVDF.

The present invention further provides a hydrophilically modified fluoropolymer porous membrane produced by the method described above.

The present invention further provides a method of filtering a fluid, the method comprising passing the fluid through the hydrophilic fluoropolymer porous membranes described above.

The following examples further illustrate the invention but, of course, should not be construed as in any way limiting its scope.

Example 1

Materials: The following materials were purchased and used as received.

Dimethyl 5-norbornene-2,3-dicarboxylate (C3) was purchased from Alfa Aesar,

Dichloromethane (DCM) was stored over activated Alumina and purged with Argon before use, Isopropyl alcohol (IPA), dicyclopentadiene (DCPD), 1H,1H,2H-Perflouro-1-octene (PF6), 1H,1H,2H-Perflouro-1-dodecene (PF10), toluene, thionyl chloride, ethylacetate, dimethylformamide (DMF), Maleimide, furan, diisopropylazodicarboxylate (DIAD), triphenylphosphine (Ph$_3$P), 1-haxadecanol, tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use. Cyclooctadiene (COD) was purified by vacuum distillation from boron trifluoride and used fresh.

Example 2

This example illustrates the preparation of dichloro[1,3-bis(2,4,6-trimethylphenyl)-2-imidazolidinylidene](benzylidene)bis(3-bromopyridine)ruthenium(II) (G3) catalyst.

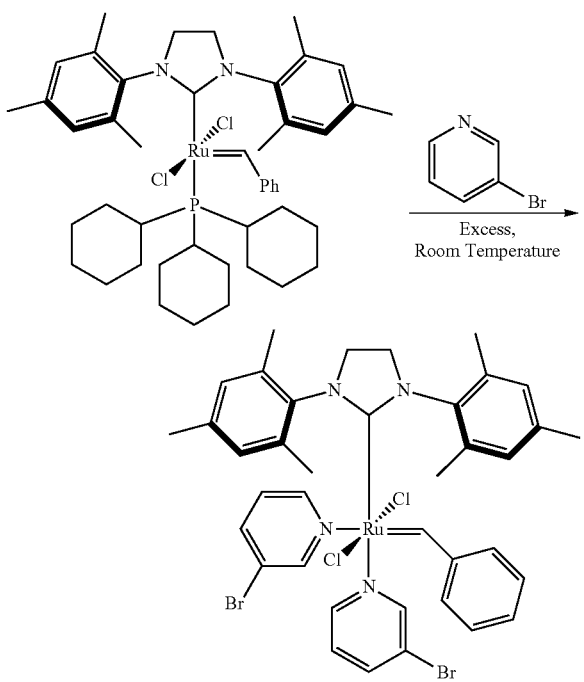

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

Example 3

This example illustrates the gel permeation chromatographic characterization of the homopolymer and copolymers in accordance with an embodiment of the invention.

The homopolymer and block copolymer obtained were characterized for their molecular weight and molecular weight distribution properties by the MALS-GPC technique under the following conditions:

Mobile phase: Dichloromethane (DCM).
Mobile phase temperature: 30° C.
UV wavelength: 245 nm.
Columns used: three PSS SVD Lux analytical columns (styrene-divinylbenzene copolymer network), columns having as stationary phase beads of diameter 5 μm and pore sizes of 1000 A, 100,000 A, and 1,000,000 A, and guard columns.
Flow rate: 1 mL/min.
GPC system: waters HPLC alliance e2695 system with UV and RI detectors
MALS system: The DAWN HELEOS 8 system with 8 detectors operating a laser at 664.5 nm.

Example 4

This example illustrates a procedure to prepare NPF6 monomer in accordance with an embodiment of the invention.

Dicyclopentadiene

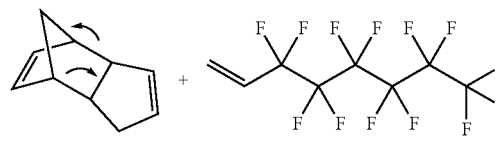

1H,1H,2H-Perfluoro-1-octene

+

2 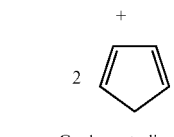

Cyclopentadiene

-continued

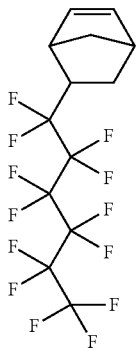

5-(Perfluoroctyl)norbornene
Fw = 412.2

A Parr high pressure reactor cylinder vessel was charged with DCPD (100 ml, 737 mmol), PF6 (168 ml, 737 mmol) and the cylinder was attached to the reactor, and hydroquinone (2.43 g, 22.1 mmol), heated to 170° C. for 72 hours. The reaction content was dissolved into 150 ml DCM and transferred into 500 ml round bottom flask to purify the monomer by vacuum distillation.

$^1$H-NMR (CDCl$_3$): δ (ppm) 6.2-6.0 (2H), 3.2 (1H), 3.0 (1H), 2.8 (1H), 2.0 (1H), 1.5 (1H), and 1.2-1.4 (2H). $^{19}$F-NMR (CDCl$_3$): δ −89.9 (s), −112.6 (m), −123.8 to −121.3 (m), −127.1 to −125.3 (m).

Example 5

This example illustrates a procedure to prepare NPF10 monomer in accordance with an embodiment of the invention.

Dicyclopentadiene

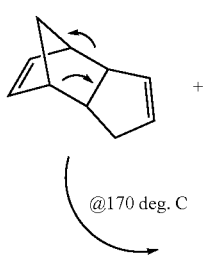

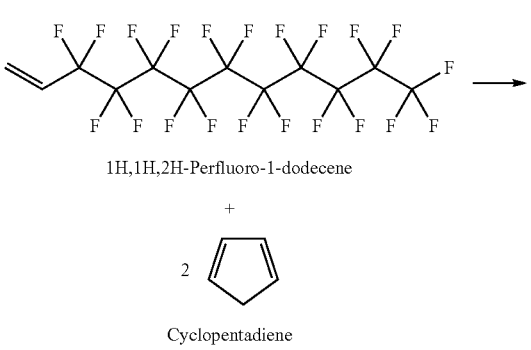

1H,1H,2H-Perfluoro-1-dodecene

+

2 Cyclopentadiene

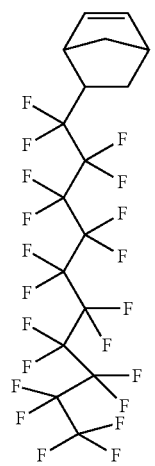

Norbornene perfluorodecane
NPF10
Fw = 612.22

A Parr high pressure reactor cylinder vessel was charged with DCPD (24.6 ml, 183 mmol), PF6 (132 ml, 370 mmol) and the cylinder was attached to the reactor, and hydroquinone (1.08 g, 10 mmol), heated to 170° C. for 72 hours. The reaction content was dissolved into 150 ml DCM and transferred into 500 ml round bottom flask to purify the monomer by vacuum distillation.

$^1$H-NMR (CDCl$_3$): δ (ppm) 6.2-6.0 (2H), 3.2 (1H), 3.0 (1H), 2.8 (1H), 2.0 (1H), 1.5 (1H), and 1.2-1.4 (2H).
$^{19}$F-NMR (CDCl$_3$): δ −80.9 (s), −112.6 (m), −123.8 to −121.4 (m), −127.2 to −125.5 (m).

Example 6

This example illustrates a procedure to prepare C2 monomer in accordance with an embodiment of the invention.

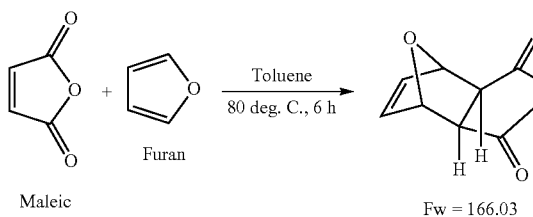

Maleic anhydride

Furan

Fw = 166.03
(C2)
exo-7-oxanorbornene-5.6-dicarboxyanhydride

In a clean 2 L round bottom flask (RBF) equipped with magnetic stirring bar, furan (390 ml, 3.35 mol) was added to a solution of maleic anhydride (350 g, 3.57 mol) in 1.5 L of toluene. The mixture was heated at 80° C. for 6 h. C2 was obtained as white precipitate from the solution upon washing with toluene (200 mL, 3×) and filtration. The white solid was dried under vacuum at room temperature for 24 h. C2 was obtained as a pure exo-isomer in yield of 650 g, 95%.
$^1$H-NMR (300 MHz, DMSO): δ (ppm) 6.6 (s, 2H), 5.4 (s, 2H), 3.15 (s, 2H).

Example 7

This example illustrates a procedure to prepare a C4 monomer, which is a dimethyl ester of the C2 monomer, in accordance with an embodiment of the invention.

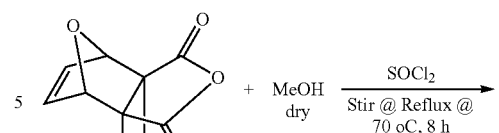

Fw = 164.15

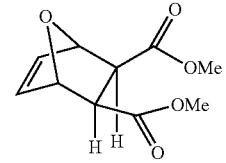

Dimethylester exo-7-oxanorbornene-5.6-dicarboxyic acid
Fw = 212.7

To 500 ml RBF, exo-7-oxanorbornene-5.6-dicarboxyanhydride (C2) (65 g, 0.4 mol) was dissolved in methanol (750 ml), thionyl chloride (25 ml) was added to the C2 solution slowly drop wise to form a yellow solution. The solution was refluxed for 48 hours after which the solvent was removed till dryness and to obtain the monomer. The solid was dissolved in ethyl acetate, washed with K$_2$CO$_3$ solution (200 ml, 2×), washed with DI water (200 ml, 2×) and dried over MgSO$_4$. The resulting yellow solution was concentrated to give the C4 monomer. $^1$H-NMR (CDCl$_3$): δ (ppm) 6.49 (s, 2H), 5.2 (s, 2H), 3.8 (s, 2H) 3.7 (s, 6H), 2.8 (s, 2H).

Example 8

This example illustrates a procedure to prepare N-2-Mercapto-Ethyl-Norbornene-Dicarboximide (NHS).

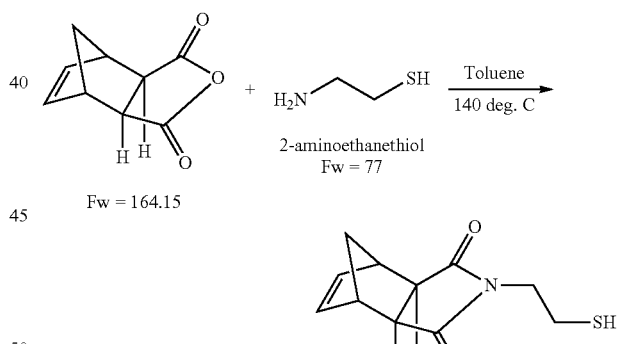

2-aminoethanethiol
Fw = 77

Fw = 164.15

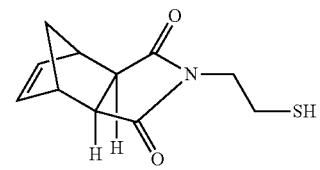

norbornene-N-4 mercaptoethyl-5.6-dicarboxyanhydride
Fw = 223.28

To 500 ml RBF, norbornene-5.6-dicarboxyanhydride (25 g, 1.5 mol) was dissolved in toluene (300 ml), aminoethanethiol (14 ml, 1.83 mol) was added to the solution slowly drop wise. A Dean-Stark trap was attached to a condenser attached to an RBF to collect the water formed during the reaction. The solution was refluxed for 24 hours after which the solvent was removed from the yellow solution till dryness and to obtain the monomer. The resulting solid was dissolved in ethylacetate, washed with K$_2$CO$_3$ solution (200 ml, 2×), washed with DI water (200 ml, 2×) and dried over MgSO$_4$. The resulting yellow solution was concentrated to give the monomer.

¹H-NMR (CDCl₃): δ (ppm) 6.25 (s, 2H), 5.5 (s, 2H), 3.35 (s, 2H), 3.35 (s, 2H), 3.7 (s, 6H), 2.8 (m), 1.75 (m), 1.5 (m), 1.25 (m).

Example 9

This example illustrates the synthesis and properties of copolymer Poly(C2-b-NPF6) in accordance with an embodiment of the invention.

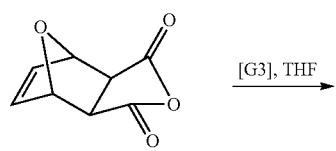

C2, Mw = 166.13
cis-5-oxaNorbornene-
exo-2,3-dicarboxylic anhydride

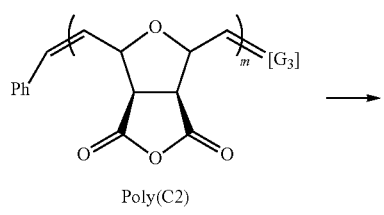

Poly(C2)

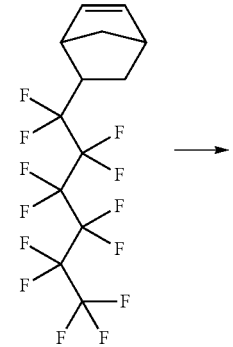

5-(Perfluorohexyl)
norbornene

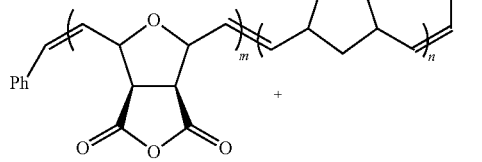

Poly(C2-b-NPF6)

+

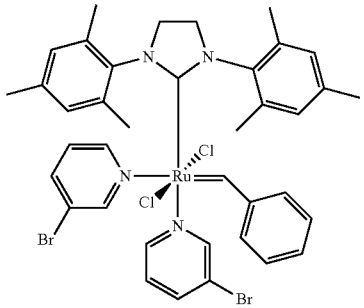

[G3] =

Grubbs 3rd generation catalyst

Grubbs 3$^{rd}$ generation (G3) catalyst (22 mg, 0.025 mmol) was weighed in 40 mL vial with equipped with fluoropolymer resin-silicone septa open-top cap. G3 was dissolved in Argon degassed THF (60 mL) and transferred via cannula to clean 1 L RBF equipped with stirring bar. A solution of C2 monomer (3.05 g, 18.4 mmol) in THF (86 mL) was degassed with Argon gas and transferred into the G3 solution and stirred for 30 minutes. A solution of NPF6 monomer (1.03 g, 2.5 mmol) in THF (208 mL) was degassed with Argon gas and transferred into the growing Poly(C2) block solution and was stirred for another 60 minutes. Ethylvinylether (2 mL) was then added to the yellow solution of the diblock copolymer to terminate the reaction. The polymer was precipitated in MeOH (2 L, 2×) to recover the white solid of pure polymer. The resulting polymer was filtered and dried under vacuum at room temperature, yield (4.0 g, 98%).

¹H-NMR (300 MHz, DMSO): δ (ppm) 12.25 (s), 5.5 to 6.0 (m), 4.75 to 5.25 (s), 4.5 to 4.75 (s), 3.75 (s), 3.3 (s), 3.25 (s).

Elemental Analysis data are set forth in Table 1 below.

TABLE 1

Elemental Analysis

| Polymer Acronym | Elemental Analysis | Theoretical (w %) | | | Actual (w %) | | | F-block w % | Hydro-philic w % | Mole % F-block % | Mole % Hydro-philic % |
|---|---|---|---|---|---|---|---|---|---|---|---|
| | | C % | H % | F % | C % | H % | F % | | | | |
| Poly (C2-b-NPF6)-1 | C, H, F | | | | 49.68% | 4.12% | 12.25% | | 80% | 9% | 91% |
| Poly (C2-b-NPF6)-2 | C, H, F | | | | 48.02% | 4.45% | 3.05% | 20% | 95% | 2% | 98% |

The Poly(C2-b-NPF6)-1 copolymer was dissolved in THF to provide a 1% by wt solution. A PTFE microporous support (KA-N3P72) sample was immersed in the polymer solution for 1 hr. The PTFE sample was air dried for 10 minutes, followed by 30 min of washing in THF. The sample was again air dried for 10 minutes. The CWST of the coated PTFE membrane was measured to be 33.41 dyne/com. The CWST of the starting PTFE membrane was 25.4 dyne/cm.

Example 10

This example demonstrates the synthesis and properties of another copolymer Poly(C3-b-NPF6) in accordance with an embodiment of the invention.

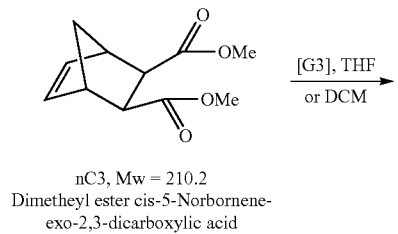

nC3, Mw = 210.2
Dimetheyl ester cis-5-Norbornene-exo-2,3-dicarboxylic acid

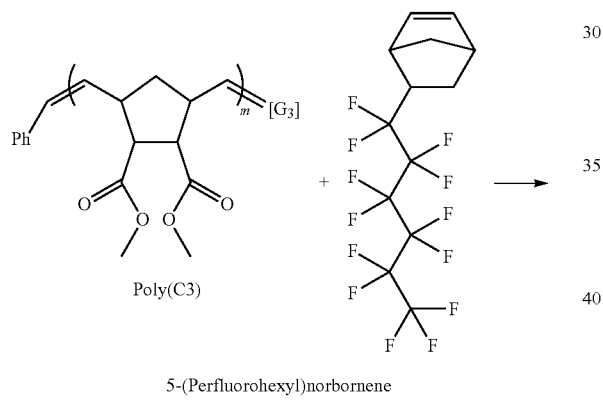

Poly(C3)

5-(Perfluorohexyl)norbornene

Poly(C3-b-NPF6)

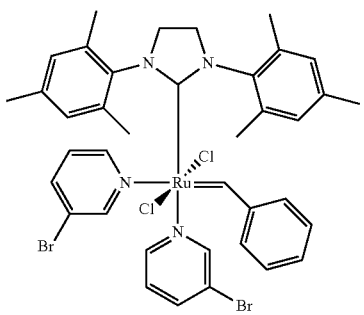

Grubbs 3rd generation catalyst

Grubbs $3^{rd}$ generation (G3) catalyst (11 mg, 0.012 mmol) was weighed in 40 mL vial with equipped with fluoropolymer resin-silicone septa open-top cap. G3 was dissolved in Argon degassed THF (60 mL) and transferred via cannula to clean 1 L RBF equipped with stirring bar. A solution of the C3 monomer (2.5 g, 12 mmol) in THF (86 mL) was degassed with Argon gas and transferred into the G3 solution and shirred for 30 minutes. A solution of the NPF6 monomer (0.86 g, 2.0 mmol) in THF (208 mL) was degassed with Argon gas and transferred into the growing Poly(C3) block solution and was stirred for another 60 minutes. Ethylvinylether (2 mL) was then added to the yellow solution of the diblock copolymer to terminate the reaction. The polymer was then precipitated in MeOH (2 L, 2×) to recover the white solid of pure polymer. The resulting polymer was filtered and dried under vacuum at room temperature, yield (3.0 g, 90%).

The $^1$H NMR data are set forth below and the elemental analysis is set forth in Table 2. $^1$H-NMR (300 MHz, CDCl3): δ (ppm) 5.7 to 5.2 (s broad), 3.7 to 3.5 (m broad), 3.3 to 2.8 (m broad), 2.5 to 1.75 (m broad), 1.6 (s broad), 1.25 (s broad).

TABLE 2

Elemental Analysis of Poly(C3-b-NPF6)

| Polymer Acronym | Material ID | Elemental Analysis | Actual (w %) | | | F-block w % | Hydro-philic w % | Mole % F-block % | Mole % Hydro-philic % |
|---|---|---|---|---|---|---|---|---|---|
| | | | C % | H % | F % | | | | |
| Poly (C3-b-NPF6) | KA-N4P10-1 | C, H, F | 56.19% | 5.67% | 14.88% | 25% | 75% | 14% | 86% |

The Poly(C3-b-NPF6)-1 copolymer was dissolved in THF to provide a 1% by wt solution. A PTFE porous support sample was immersed in the polymer solution for 1 hr. The PTFE sample was air dried for 10 minutes, followed by 30 min of washing in THF. The sample was again air dried for 10 minutes. The CWST of the coated PTFE membrane was measured to be 30 dyne/com. The CWST of the starting PTFE support was 25.4 dyne/cm.

Example 11

This example demonstrates the synthesis and properties of yet another copolymer in accordance with an embodiment of the invention.

Poly(C4-b-NPF6) was synthesized as follows. Grubbs $3^{rd}$ generation (G3) catalyst (25 mg, 0.028 mmol) is weighed in 40 mL vial with equipped with fluoropolymer resin-silicone septa open-top cap. G3 was dissolved in Argon degassed THF (60 mL) and transferred via cannula to clean 1 L RBF equipped with stirring bar. A solution of C4 monomer (2.5 g, 11.8 mmol) in THF (86 mL) was degassed with Argon gas and transferred into the G3 solution and shirred for 30 minutes. A solution of NPF6 monomer (0.86 g, 2.0 mmol) in THF (208 mL) was degassed with Argon gas and transferred into the growing Poly(C4) block solution and is stirred for another 60 minutes. Ethylvinylether (2 mL) was then added to the yellow solution of the diblock copolymer to terminate the reaction. The polymer was precipitated in MeOH (2 L, 2×) to recover the white solid of pure polymer. The polymer was filtered and dried under vacuum at room temperature, yield (3.0 g, 90%).

$^1$H-NMR (300 MHz, CDCl3): δ (ppm) 6.85 (s broad), 5.8 (s broad), 5.6 (s broad), 5.2 to 4.9 (s broad), 4.8 to 4.5 (s broad), 4.4 to 4.0 (m broad) 4.0 to 3.6 (m broad) 3.2 to 2.9 (m broad), 1.4 to 1.2 (m broad).

Figure 3:
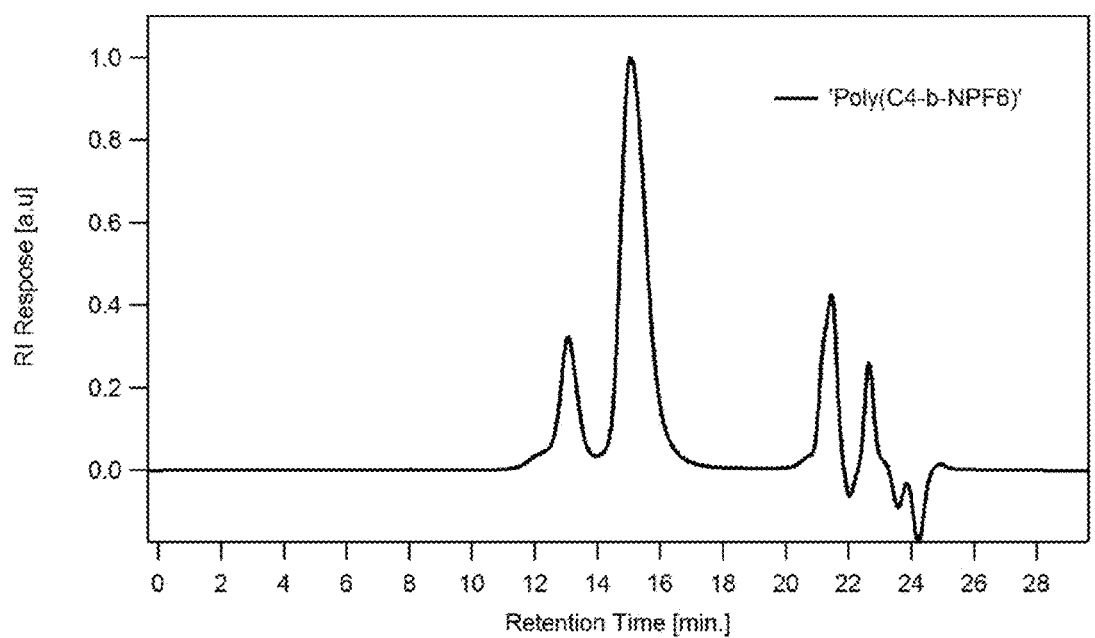
FIG. 3 depicts the GPC trace of a copolymer Poly(C4-b-NPF6) in accordance with an embodiment of the invention.

The GPC trace of the copolymer in $CH_2Cl_2$ is shown in FIG. 3. The copolymer had the following properties: Mn=98800, Mw=127200, PDI=1.28.

The Poly(C4-b-NPF6)-1 copolymer was dissolved in THF to provide a 1% by wt solution. A PTFE microporous membrane sample was immersed in the polymer solution for 1 hr. The PTFE sample was air dried for 10 minutes, followed by 30 min of washing in THF. The sample was again air dried for 10 minutes. The CWST of the coated PTFE membrane was measured to be 39 dyne/com. The CWST of the starting PTFE membrane was 25.4 dyne/cm.

TABLE 3

| Membrane ID | Control (HHP-0015-005-BBUV) | Coated membrane (C2-Polymer) |
|---|---|---|
| Water flux (L/m²/h) before SPM | 490.43 | 207.49 |
| Water flux (L/m²/h) after SPM | 207.49 | 122.61 |
| CWST(Dynes/cm) before SPM | 31 | 79 |
| CWST (Dynes/cm) after SPM | 31 | 42 |

Example 12

This example demonstrates the synthesis and properties of a polymer having pendant perfluoroalkylthio groups in accordance with an embodiment of the invention.

A Poly(C2) homopolymer (1.0 g, 6.0 mmol), 1H,1H,2H-Perflurodecanethiol (3.0 g, 6.0 mmol), and AIBN (79.8 mg) were dissolved in 33 ml of THF and allowed to react at 55° C. for 26 h under nitrogen. The reaction mixture was poured into water. The precipitate obtained was dissolved in THF and precipitated again from heptane to yield a dark brown solid polymer of interest.

$^1$H-NMR (300 MHz, CDCl3): δ (ppm) 14 to 13 (s broad), 5.75 (s broad), 5.5 (s broad), 4 to 5 (m broad) 3.5 to 2.5 (m broad), 1.6 (s broad).

TABLE 4

Elemental Analysis

| Polymer Acronym | Material ID | Elemental Analysis | Actual (w %) | | | | F-block % | Hydro-philic % | Thio % | Mole % F-block % | Mole % Hydro-philic % | Mole % Thio % | degree of thio modification |
|---|---|---|---|---|---|---|---|---|---|---|---|---|---|
| | | | C % | H % | F % | S % | | | | | | | |
| polyC2/ thiolene-ring open | GS-A1404-01-30 (from KA-N3P66) | CH, F, S | 27.04% | 2.30% | 2.22% | 0.51% | 3% | 97% | 3% | 1% | 99% | 1% | 1% |
| | GS-A1404-01-31 (from KA-N3P66) | CH, F, S | 38.17% | 3.24% | 7.00% | 0.86% | 10% | 90% | 10% | 4% | 96% | 4% | 5% |

TABLE 4-continued

Elemental Analysis

| Polymer Acronym | Material ID | Elemental Analysis | Actual (w %) | | | | F-block % | Hydro-philic % | Thio % | Mole % | | | degree of thio modification |
|---|---|---|---|---|---|---|---|---|---|---|---|---|---|
| | | | C % | H % | F % | S % | | | | F-block % | Hydro-philic % | Thio % | |
| | GS-A1404-01-32 (from KA-N3P66) | CH, F, S | 38.53% | 3.36% | 4.62% | 0.55% | 7% | 93% | 7% | 3% | 97% | 3% | 3% |
| | GS-A1404-01-33 (from KA-N3P66) | CH, F, S | 29.71% | 2.35% | 7.09% | 0.84% | 11% | 89% | 11% | 4% | | | |

The polymer having pendant perfluoroalkylthio groups was dissolved in THF to provide a 1% by wt solution. A PTFE microporous support sample was immersed in the polymer solution for 1 hr. The PTFE sample was air dried for 10 minutes, followed by 30 min of washing in THF. The sample was again air dried for 10 minutes. The CWST of the coated PTFE support was measured to be 33.41 dyne/com (triplicate) (35 partial). The CWST of the starting PTFE support was 25.4 dyne/cm.

Example 13

This example demonstrates the synthesis and properties of a further copolymer in accordance with an embodiment of the invention.

Poly(C2 diacid-b-NPF6): Poly(C2-b-NPF6) was reacted with 0.1N NaOH solution to obtain Poly(C2 diacid-b-NPF6). Poly(C2-b-NPF6) diblock copolymer was dissolved in THF (1% mass) to form homogenous solution. The polymer solution was treated with 0.1 N NaOH solution in water. The mixture was stirred at ambient temperature for 1 h followed by precipitation in hexane.

$^1$H-NMR (300 MHz, CDCl3): δ (ppm) 14 to 13 (s broad), 6.0 to 5.5 (m broad), 5.3 to 4.75 (s broad), 5.375 to 4.25 (s broad) 3.25 (s broad), 3.3 (s broad), 3.1 (s broad).

The polymer was coated on a porous PTFE support and its CWST was measured. The results obtained are set forth in Table 5.

Example 14

This example demonstrates the synthesis and properties of a still further copolymer Poly(C3-r-NPF6) in accordance with an embodiment of the invention.

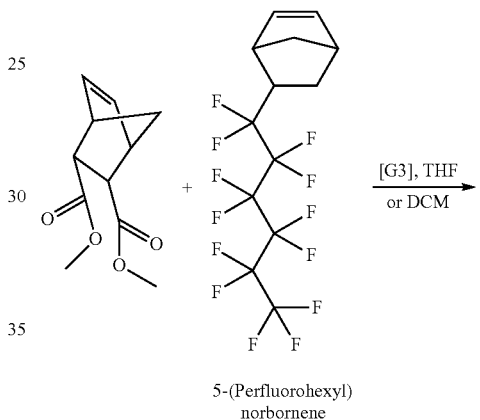

5-(Perfluorohexyl) norbornene

TABLE 5

| Description | CWST 1 | Post Treatment | CWST 2 | AVG WF Norm Flow (L/min/ft^2/psid) | Post Sulfuric Acid Treatment CWST 3 | Post Peroxide Treatment CWST 4 | SPM CWST 5 |
|---|---|---|---|---|---|---|---|
| Native PTFE | 25.4 | NA | NA | 1.00 | NA | NA | NA |
| KA-N3P72-Poly-(C2-b-NPF6)-1-2.5% IN THF Jan. 29, 2014 Heat Curing | 33.41 | NaOH | 72 | 0.28 | NA | NA | NA |
| | 33.41 | | 72 | NA | NA | NA | |
| | | | 72 | NA | 42.9 | 46.41 | NA |
| | 33.41 | NaOH-Bleach | 72 | NA | 46.41 | 33.41 | 42.9 |
| KA-N3P72-Poly-(C2-b-NPF6)-1-2.5% IN THF Jan. 29, 2014 (Air Dry) | 33.41 | NaOH | 72 | NA | NA | NA | NA |
| | | NaOH - DI wash | 72 | 0.13 | 68.15 | 74.89 | NA |

-continued

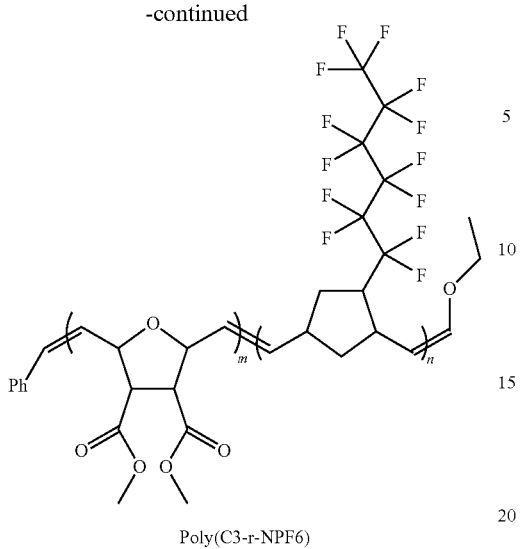

Poly(C3-r-NPF6)

Grubbs 3$^{rd}$ generation (G3) catalyst (11 mg, 0.012 mmol) was weighed in 40 mL vial with equipped with fluoropolymer resin-silicone septa open-top cap. G3 was dissolved in Argon degassed DCM (20 mL) and transferred via cannula to clean 250 ml RBF equipped with stirring bar. A solution of C3 monomer (2.5 g, 12 mmol) and NYF6 (0.86 g, 2.0 mmol) mixture dissolved in DCM (90 ml) was degassed with Argon gas and transferred into the G3 solution and shined for 12 hours at room temperature. Ethylvinylether (2 mL) was then added to the yellow solution of the random copolymer to terminate the reaction. The polymer was then passed through a column of basic alumina, silica gel, and Celite to remove the catalyst. The solvent was removed in a rotary evaporator and the resulting polymer was colorless and highly viscous; yield (3.0 g, 90%).

$^1$H-NMR (300 MHz, CDCl3): δ (ppm) 6.0 to 5.0 (s broad), 3.7 to 3.5 (m broad), 3.3 to 2.8 (m broad), 2.5 to 1.75 (m broad), 1.6 (s broad), 1.25 (s broad).

The polymer was coated on a porous PTFE support and its CWST was measured. The results obtained are set forth in Table 6.

TABLE 6

Summary Data

| Coating polymer | CWST post coating | PI, (BDMB), concentration (%) | UV time (seconds) | CWST (crosslinked) | CWST post SPM | Note |
|---|---|---|---|---|---|---|
| Poly (C3-r-NPF6) | 33/35 35/37 35/37 | 3 | 90 120 180 | 37 37 37 | 30 25 30 | 30 partial |
| PTFE native | No coating, 25 | | | | | |

PI = Photoinitiator = 2-Benzyl-2-(dimethylamino)-4'-morpholinobutyrophenone = BDMB Example 15

This example demonstrates the synthesis and properties of a triblock polymer in accordance with an embodiment of the invention.

Poly(C4-r-NPF6-r-NHS) was synthesized by polymerizing a mixture of dimethyl ester of cis-5-oxanorbornene-exo-2,3-dicarboxylic acid, 5-(perfluorohexyl)norbornene, and N-mercaptoethyl cis-5-norbornene-exo-2,3-dicarboxylimide catalyzed by a ROMP catalyst.

$^1$H-NMR (300 MHz, CDCl3): δ (ppm) 6 (s broad), 5.9 to 5.0 (m broad), 5.1 to 4.6 (m broad), 4.6 to 4.1 (m broad), 4.0 to 3.0 (m broad), 3.0 to 2.4 (m broad), 2.3 to 1.4 (m broad), 1.25 (s broad).

The polymer was coated on a porous PTFE support and its CWST was measured. The results obtained are set forth in Table 7.

TABLE 7

Summary Data

| Coating polymer | CWST post coating | PI concentration (%) | UV time (seconds) | CWST (crosslinked) | CWST post SPM | Note |
|---|---|---|---|---|---|---|
| P(C4-NPF6-NHS)-3 | 37/39 | NA | 90' | 40 | 25 | 30 partial |
| | 37/39 | | 180 | 40 | 30 | 30 partial |
| | 37/39 | 1 | 90' | 35 | 25 | 30 partial |
| | 37/39 | | 120 | 35 | 25 | 30 partial |

PI = Photoinitiator = 2-Benzyl-2-(dimethylamino)-4'-morpholinobutyrophenone = BDMB All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composite hydrophilic porous membrane comprising a porous fluoropolymer support and a coating comprising a copolymer, wherein the copolymer comprises repeat units A and B, wherein A is selected from

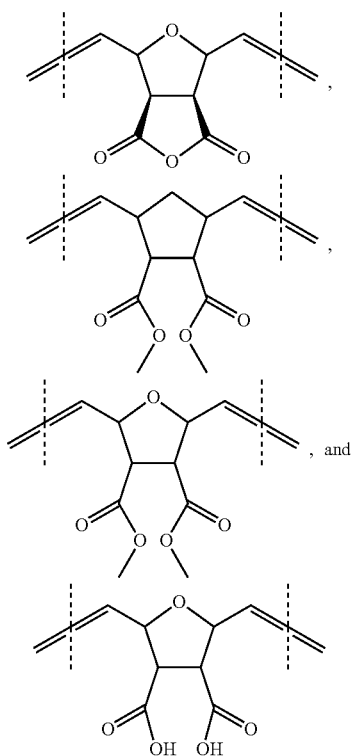

and B is of the formula:

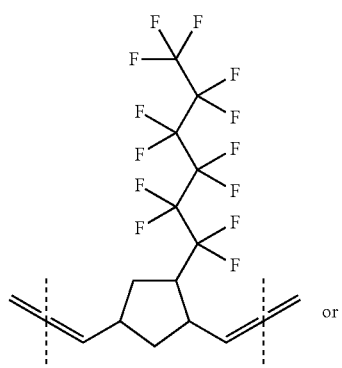

or

-continued

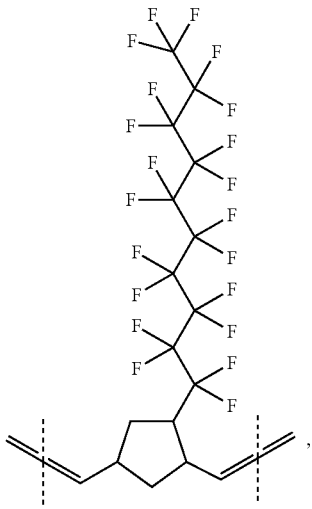

wherein:
the copolymer is a block copolymer or a random copolymer; and
the number of repeat units of each of B and A are n and m, and range from 1 to about 1000, provided the sum of n and m is equal to or greater than 10,
wherein the copolymer is optionally crosslinked.

2. The composite hydrophilic porous membrane of claim 1, wherein the copolymer has chain end groups selected from aryl groups and alkoxy groups.

3. The composite hydrophilic porous membrane of claim 1, wherein the copolymer is of one of the following formulae:

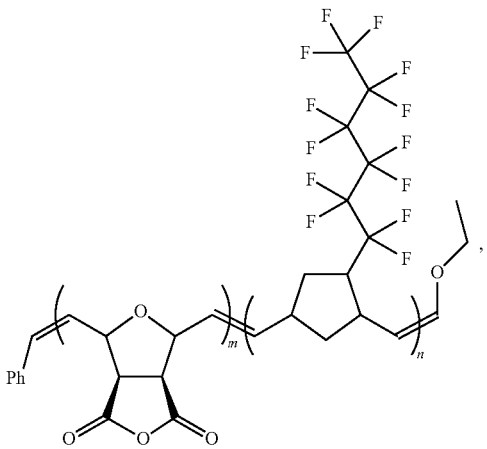

Poly(C2-b-NPF6)

-continued

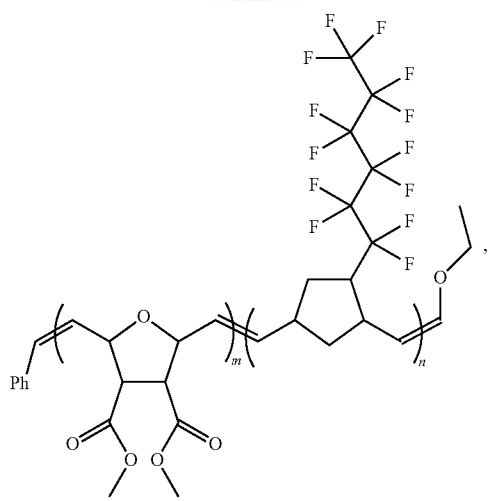

Poly(C3-b-NPF6)

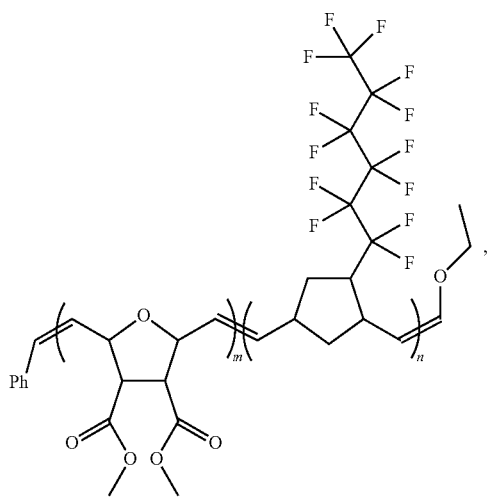

Poly(C4-b-NPF6)

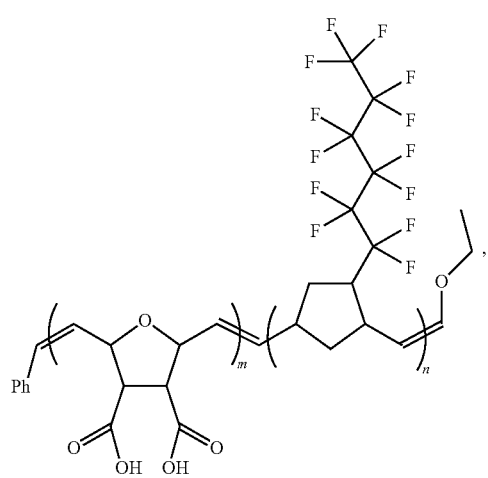

Poly(C2-diacid-b-NPF6)

-continued

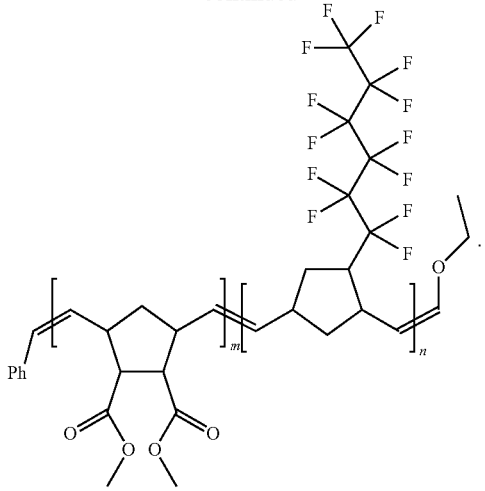

Poly(C3-r-NPF6)

4. The composite hydrophilic porous membrane of claim 1, wherein the copolymer further comprises one or more repeat units C of the formula:

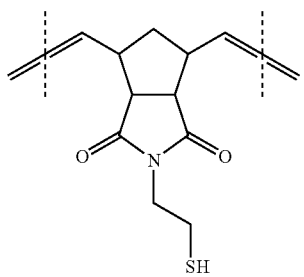

wherein the ratio o/(m+n) is from above 0 to about 0.25, o being the number of repeat units C comprised in the copolymer.

5. The composite hydrophilic porous membrane of claim 4, wherein the copolymer is a random copolymer and is of the formula:

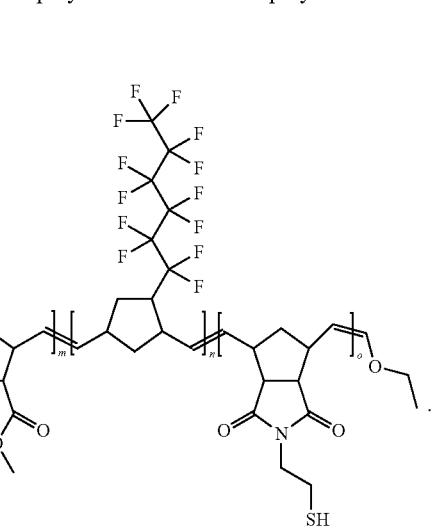

6. A method of hydrophilically modifying a porous fluoropolymer support comprising:
(i) providing a porous fluoropolymer support;
(ii) coating the porous fluoropolymer support with a solution comprising a solvent and copolymer wherein the copolymer comprises repeat units A and B, wherein A is selected from

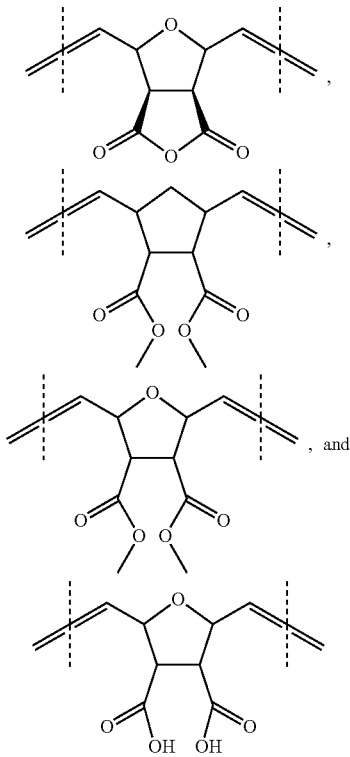

, and and B is of the formula:

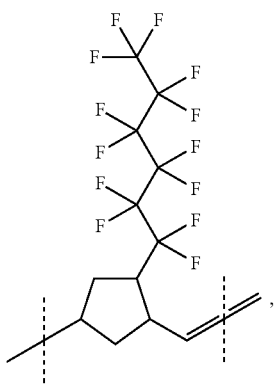

wherein:
the copolymer is a block copolymer or a random copolymer; and
the number of repeat units of each of B and A are n and m, and range from 1 to about 1000, provided the sum of n and m is equal to or greater than 10,
(iii) drying the coated fluoropolymer support from (ii) to remove at least some of the solvent from the solution comprising said copolymer or polymer; and optionally (iv) crosslinking said copolymer or polymer present in the coated fluoropolymer support.

7. The method of claim 6, wherein the copolymer has chain end groups selected from aryl groups and alkoxy groups.

8. The method of claim 6, wherein the copolymer is of one of the following formulae:

Poly(C2-b-NPF6)

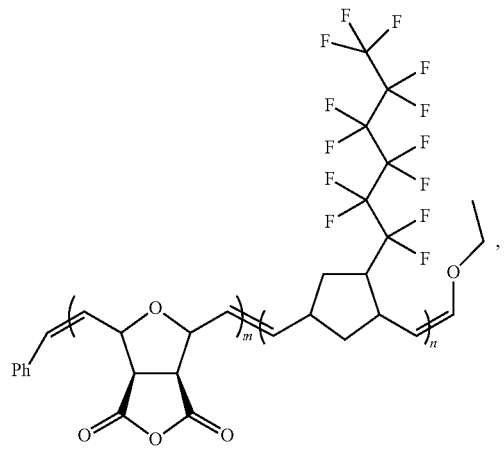

Poly(C3-b-NPF6)

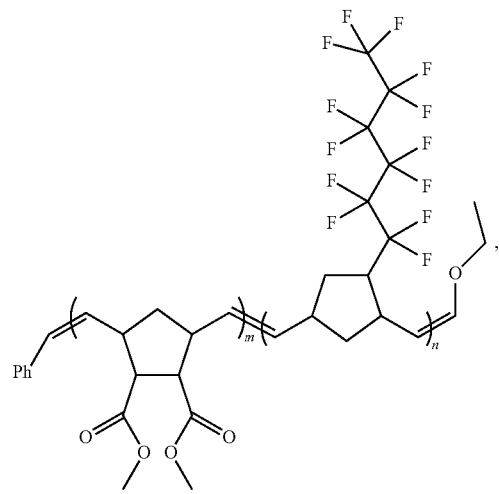

Poly(C4-b-NPF6)

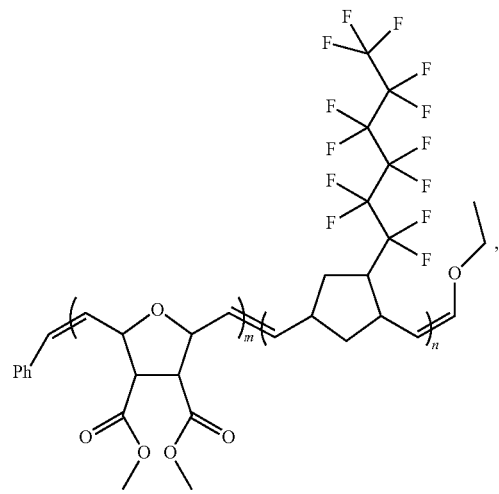

-continued

Poly(C2 diacid-b-NPF6)

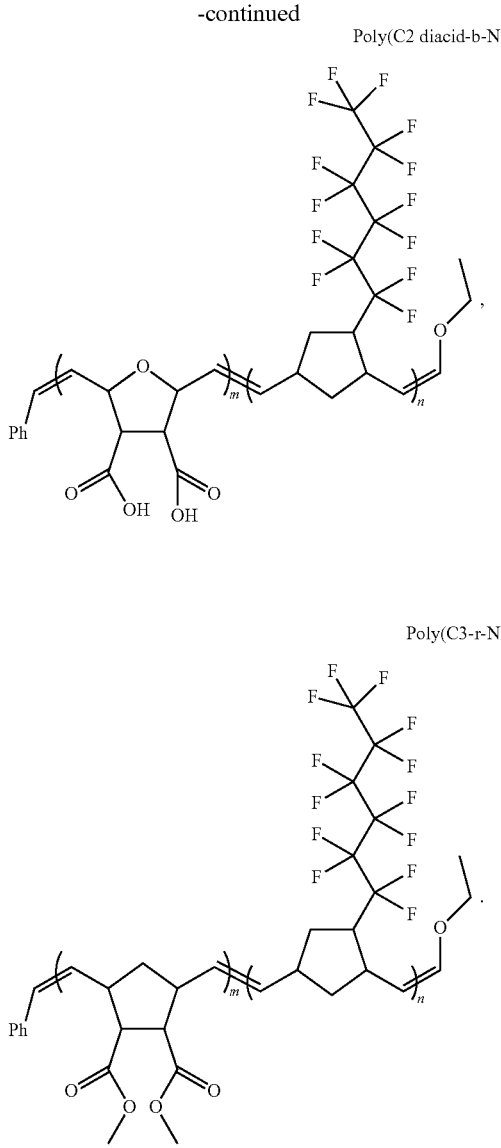

Poly(C3-r-NPF6)

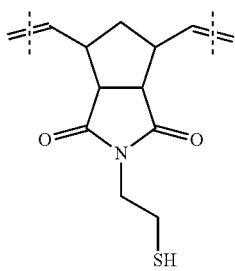

wherein the ratio $o/(m+n)$ is from above 0 to about 0.25, o being the number of repeat units C comprised in the copolymer.

10. The method of claim 9, wherein the copolymer is a random copolymer and is of the formula:

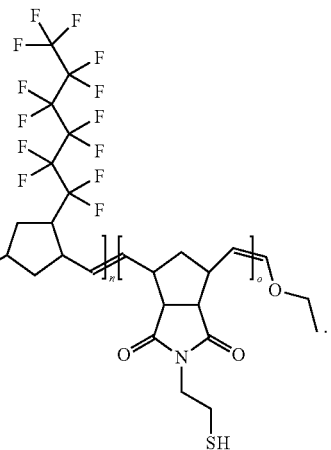

11. The method of claim 6, wherein the crosslinking of the coating is carried by exposing the coating to UV radiation.

12. A hydrophilically modified porous fluoropolymer membrane produced by the method of claim 6.

13. The hydrophilic porous membrane of claim 1, wherein the porous fluoropolymer support is selected from PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

9. The method of claim 6, wherein the copolymer further comprises one or more repeat units C of the formula:

* * * * *